U S006765856B2

United States Patent
Tonami

(10) Patent No.: US 6,765,856 B2
(45) Date of Patent: Jul. 20, 2004

(54) INFORMATION REPRODUCING APPARATUS AND PHASE LOCK CONTROL APPARATUS

(75) Inventor: Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 519 days.

(21) Appl. No.: 09/903,557

(22) Filed: Jul. 13, 2001

(65) Prior Publication Data

US 2002/0012308 A1 Jan. 31, 2002

(30) Foreign Application Priority Data

Jul. 24, 2000  (JP) ...................................... 2000-222004

(51) Int. Cl.[7] ................................................ G11B 5/76
(52) U.S. Cl. ................. 369/59.2; 369/47.35; 369/59.21
(58) Field of Search .......................... 369/47.35, 53.31, 369/59.2, 59.21, 59.23, 59.24; 375/230, 232, 233

(56) References Cited

U.S. PATENT DOCUMENTS 6,295,316 B1 * 9/2001 Tonami et al. .............. 375/230

FOREIGN PATENT DOCUMENTS

JP          10-172250        6/1998

OTHER PUBLICATIONS

"A Study of Digital Auto Equalizer and PLL System Using Maximum Likelihood Error for Digital VCRs" by Tonami et al.; IEEE Transactions on Consumer Electronics, vol. 43, No. 3; Aug. 1997; pp. 934–944.

* cited by examiner

Primary Examiner—Paul W. Huber
(74) Attorney, Agent, or Firm—Louis Woo

(57) ABSTRACT

A sample of an information signal is periodically generated in response to a sampling clock signal. A level relation between successive ones of the information-signal samples is detected. A peak-corresponding sample is detected among the information-signal samples in response to the detected level relation and in response to a prescribed level range containing a "0" level. A level represented by the detected peak-corresponding sample is outside the prescribed level range. Calculation is made regarding a level difference between information-signal samples immediately preceding and immediately following the detected peak-corresponding sample. A phase error signal is generated in response to the calculated level difference. The sampling clock signal is controlled in response to the phase error signal to lock the sampling clock signal in phase with the information signal.

11 Claims, 13 Drawing Sheets

OUTPUT VALUE/INPUT VALUE

OUTPUT VALUE/INPUT VALUE

INFORMATION REPRODUCING APPARATUS AND PHASE LOCK CONTROL APPARATUS

BACKGROUND OF THE INVENTION

1. Field of the Invention

This invention relates to an apparatus for reproducing a digital signal (digital information) from a recording medium such as an optical disk, a hard disk, or a magnetic tape. Also, this invention relates to a phase lock control apparatus usable in a digital signal reproducing apparatus.

2. Description of the Related Art

In a typical digital signal reproducing apparatus, a digital signal reproduced from a recording medium is periodically sampled at a timing determined by a sampling clock signal, and original data are recovered from the resultant samples of the reproduced digital signal. For accurate recovery of the original data, it is necessary that the sampling clock signal is correctly locked in phase with the reproduced digital signal.

In general, a digital signal reproduced from a recording medium is considered to be one of transmitted digital signals. In some cases, high-frequency signal components are attenuated when a signal travels along a transmission line. The waveform of a reproduced signal representative of digital information is smoothed as a result of attenuation of high-frequency signal components. Fluctuation signal components such as jitter signal components are sometimes caused when a signal passes through portions of a recording and reproducing apparatus. Noise adversely affects the level of a reproduced signal. These factors cause a sampling clock signal and a reproduced digital signal to be out of phase with each other. In other words, the factors cause a phase error between the sampling clock signal and the reproduced digital signal. The phase error decreases the accuracy of recovered original data.

Japanese patent application publication number 10-172250 discloses a digital signal reproducing apparatus including a phase lock control circuit. In the apparatus of Japanese application 10-172250, the phase lock control circuit has a provisional determination device for provisionally determining a likely value with respect to a digital information signal fed thereto.

The apparatus of Japanese application 10-172250 includes an A/D converter, a controller, and an error calculator in addition to the provisional determination device. The A/D converter changes a reproduced analog signal representative of reproduced digital data into a digital signal in response to a sampling clock signal. The provisional determination device provisionally determines the likeliest value with respect to the digital signal generated by the A/D converter through maximum-likelihood detection using a correlation between signal components. The error calculator generates an error signal indicative of an amplitude error on the basis of the result of the provisional determination by the provisional determination device. The controller adjusts the frequency of the sampling clock signal in response to the error signal generated by the error calculator. The sampling clock signal is fed to the A/D converter.

In the apparatus of Japanese application 10-172250, the sampling clock signal fed to the A/D converter is generated by an analog VCO (voltage-controlled oscillator). The analog VCO occupies a great space. Therefore, the apparatus of Japanese application 10-172250 tends to be large in size.

SUMMARY OF THE INVENTION

It is a first object of this invention to provide a small-sized information reproducing apparatus.

It is a second object of this invention to provide a small-sized phase lock control apparatus.

A first aspect of this invention provides an information reproducing apparatus comprising first means for periodically generating a sample of an information signal in response to a sampling clock signal; second means for detecting a level relation between successive ones of the information-signal samples generated by the first means; third means for detecting a peak-corresponding sample among the information-signal samples in response to the level relation detected by the second means and in response to a prescribed level range containing a "0" level, wherein a level represented by the peak-corresponding sample detected by the third means is outside the prescribed level range; fourth means for calculating a level difference between information-signal samples immediately preceding and immediately following the peak-corresponding sample detected by the third means; fifth means for generating a phase error signal in response to the level difference calculated by the fourth means; and sixth means for controlling the sampling clock signal in response to the phase error signal to lock the sampling clock signal in phase with the information signal.

A second aspect of this invention provides an information reproducing apparatus comprising an analog-to-digital converter for converting an analog signal representative of digital information into a first digital information signal; and a re-sampling DPLL section for periodically re-sampling the first digital information signal in response to a bit clock signal to convert the first digital information signal into a second digital information signal. The re-sampling DPLL section comprises (1) an interpolator for generating samples of the second digital information signal from samples of the first digital information signal through interpolation responsive to the bit clock signal; (2) a provisional determination device for detecting a peak-corresponding sample among the samples of the second digital information signal in response to a prescribed level range containing a "0" level, wherein a level represented by the detected peak-corresponding sample is outside the prescribed level range; (3) a calculator for calculating a level difference between samples immediately preceding and immediately following the detected peak-corresponding sample; (4) means for generating a phase error signal in response to the calculated level difference; and (5) means for controlling the bit clock signal in response to the generated phase error signal to lock the bit clock signal in phase with the first digital information signal.

A third aspect of this invention provides a phase lock control apparatus apparatus comprising an analog-to-digital converter for converting an analog signal representative of digital information into a sequence of samples of a digital information signal in response to a sampling clock signal; a provisional determination device for detecting a peak-corresponding sample among the samples of the digital information signal in response to a prescribed level range containing a "0" level, wherein a level represented by the detected peak-corresponding sample is outside the prescribed level range; a calculator for calculating a level difference between samples immediately preceding and immediately following the peak-corresponding sample detected by the provisional determination device; first means for generating a phase error signal in response to the level difference calculated by the calculator; and second means for controlling the sampling clock signal in response to the phase error signal generated by the first means to lock the sampling clock signal in phase with the analog signal.

A fourth aspect of this invention is based on the second aspect thereof, and provides an information reproducing apparatus wherein the provisional determination device comprises a provisional determination circuit for detecting a likeliest peak-corresponding sample among the samples of the second digital information signal on a maximum-likelihood detection basis.

A fifth aspect of this invention is based on the fourth aspect thereof, and provides an information reproducing apparatus wherein the provisional determination circuit comprises means for detecting the likeliest peak-corresponding sample in response to a threshold value, and means for varying the threshold value.

A sixth aspect of this invention is based on the fourth aspect thereof, and provides an information reproducing apparatus wherein the calculator comprises means for calculating a level difference between samples immediately preceding and immediately following a sample of interest, and means for holding the calculated level difference until the provisional determination circuit judges the sample of interest to be the likeliest peak-corresponding sample.

A seventh aspect of this invention is based on the fifth aspect thereof, and provides an information reproducing apparatus wherein the calculator comprises means for calculating a level difference between samples immediately preceding and immediately following a sample of interest, and means for holding the calculated level difference until the provisional determination circuit judges the sample of interest to be the likeliest peak-corresponding sample.

An eighth aspect of this invention is based on the fourth aspect thereof, and provides an information reproducing apparatus wherein the provisional determination circuit comprises means for detecting the likeliest peak-corresponding sample in response to a threshold value, means for detecting at least one of (1) a frequency condition and (2) an amplitude condition represented by the samples of the second digital information signal, and means for varying the threshold value in response to the detected at least one of the frequency condition and the amplitude condition.

A ninth aspect of this invention is based on the fourth aspect thereof, and provides an information reproducing apparatus wherein the analog signal representative of the digital information comprises a signal transmitted by a partial-response system using an inter-symbol interference.

A tenth aspect of this invention is based on the first aspect thereof, and provides an information reproducing apparatus further comprising a waveform equalizer for subjecting the information signal to PR (a, b, −b, −a) waveform equalization to generate an equalization-result signal, and a decoder for decoding the equalization-result signal into original information.

An eleventh aspect of this invention is based on the first aspect thereof, and provides a reproducing apparatus wherein the analog signal representative of the digital information comprises a signal reproduced from an optical-disc recording medium in a tangential push-pull method.

DETAILED DESCRIPTION OF THE INVENTION

A prior-art information reproducing apparatus will be explained below for a better understanding of this invention.

Figure 1:
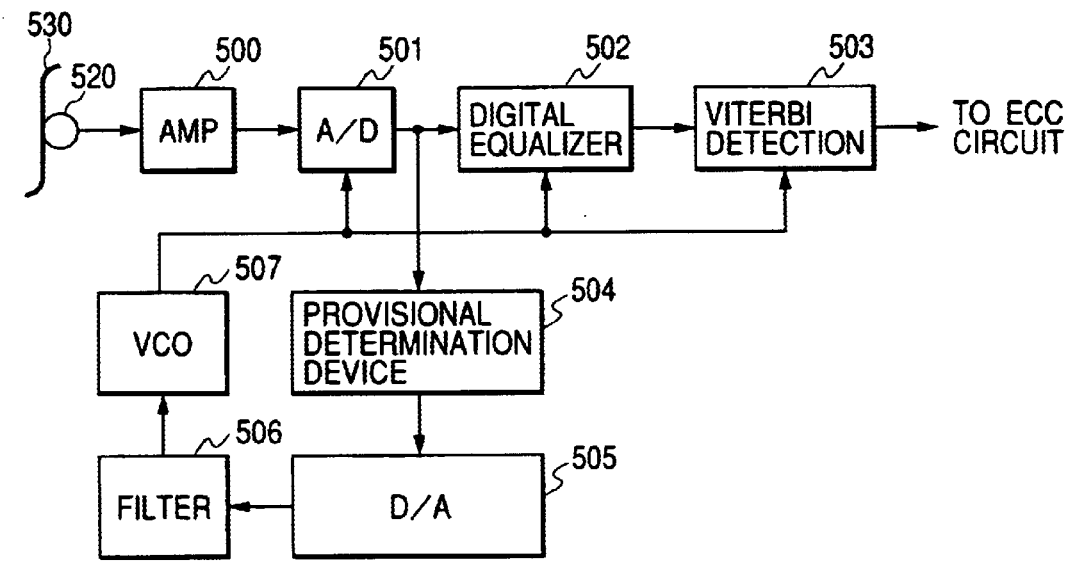
FIG. 1 is a block diagram of a prior-art information reproducing apparatus.

FIG. 1 shows a prior-art information reproducing apparatus disclosed in Japanese patent application publication number 10-172250. The prior-art apparatus of FIG. 1 includes a magnetic head 520 mounted on a rotary drum (not shown). The magnetic head 520 scans a magnetic tape 530 and reproduces a signal therefrom. The reproduced signal is outputted from the magnetic head 520 to an amplifier 500. The device 500 amplifies the output signal of the magnetic head 520. The amplifier 500 outputs the amplification-resultant signal to an A/D converter 501.

In the prior-art apparatus of FIG. 1, the A/D converter 501 periodically samples the output signal of the amplifier 500 at a timing determined by a sampling clock signal. The A/D converter 501 changes every sample of the output signal of the amplifier 500 into an 8-bit digital sample representing the level of the original sample. The A/D converter 501 outputs a sequence of the resultant digital samples to a digital equalizer 502 and a provisional determination device 504. Thus, the A/D converter 501 outputs the digital signal to the digital equalizer 502 and the provisional determination device 504.

The digital equalizer 502 subjects the output signal of the A/D converter 501 to processing in response to the sampling clock signal. The processing by the digital equalizer 502 corresponds to waveform equalization. The digital equalizer 502 outputs the processing-resultant signal to a viterbi detection circuit 503. The viterbi detection circuit 503 periodically determines a value of the output signal of the digital equalizer 502 in response to the sampling clock signal, and recovers a two-value information signal on the basis of the value determination result.

The provisional determination device 504 provisionally determines a value of the output signal of the A/D converter 501, and generates an error signal on the basis of the provisional determination result. The provisional determination device 504 outputs the error signal to a D/A converter 505. The D/A converter 505 changes the error signal into a corresponding analog signal. The D/A converter 505 outputs the analog signal to a filter 506. The filter 506 is of a low pass type. The filter 506 integrates the output signal of the D/A converter 505 into a control voltage. The filter 506 outputs the control voltage to an analog VCO (voltage-controlled oscillator) 507. The analog VCO 507 oscillates at a frequency responsive to the control voltage, and hence generates the sampling clock signal having a frequency equal to the frequency of the oscillation. The analog VCO 507 outputs the sampling clock signal to the A/D converter 501, the digital equalizer 502, and the viterbi detection circuit 503.

In the prior-art apparatus of FIG. 1, a noise removing filter (not shown) is provided between the amplifier 500 and the A/D converter 501. In addition, a DC removing circuit (not shown) is provided between the A/D converter 501 and the digital equalizer 502. The DC removing circuit sets a DC level, that is, a direct-current level of the output signal of the A/D converter 501. The digital equalizer 502 processes the output signal of the DC removing circuit.

The viterbi detection circuit 503 outputs the two-value information signal to, for example, a signal processing circuit (not shown). The signal processing circuit subjects the output signal of the viterbi detection circuit 503 to reproducing processes such as an error correction process and a de-shuffling process to reproduce original video or audio information therefrom.

Figure 2:
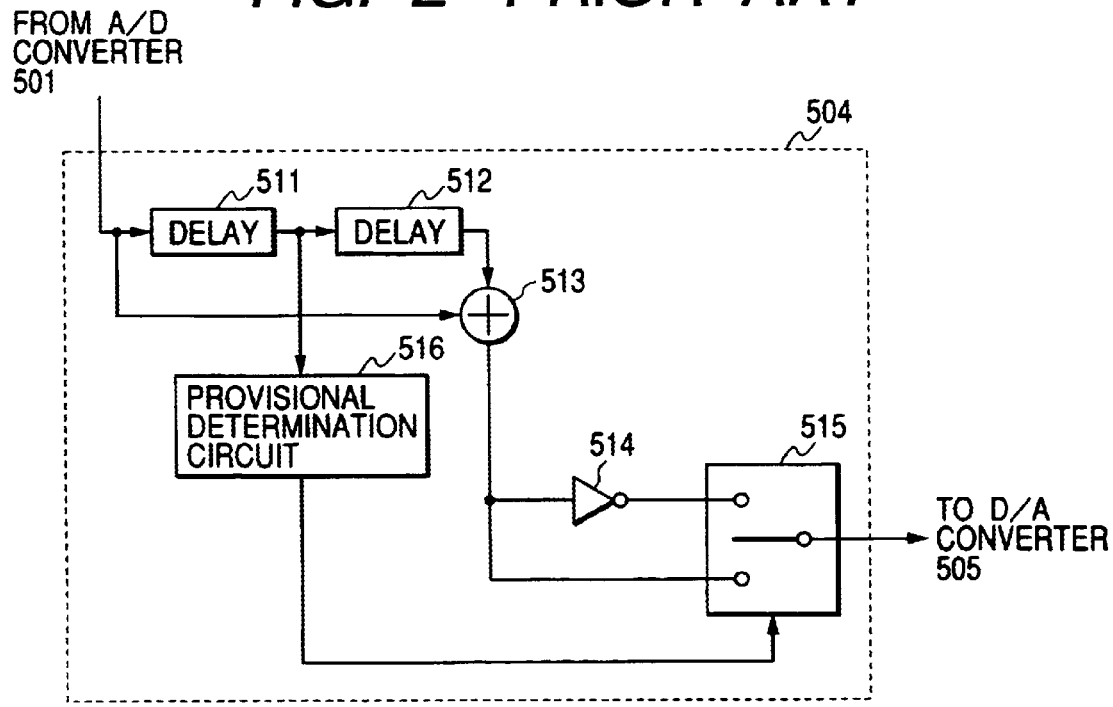
FIG. 2 is a block diagram of a provisional determination device in FIG. 1.

As shown in FIG. 2, the provisional determination device 504 includes delay elements 511 and 512, a calculator 513, an inverter 514, a switch 515, and a provisional determination circuit 516.

The delay element 511 receives the output signal of the A/D converter 501. The delay element 511 defers the output signal of the A/D converter 501 by a 1-sample corresponding time interval. The delay element 511 outputs the resultant signal to the delay element 512 and the provisional determination circuit 516. The delay element 512 defers the output signal of the delay element 511 by a 1-sample corresponding time interval. The delay element 512 outputs the resultant signal to the calculator 513.

The calculator 513 receives the output signal of the A/D converter 501. The calculator 513 computes the difference in level between the output signal of the delay element 512 and the output signal of the A/D converter 501. The calculator 513 generates a signal representing the computed level difference. The calculator 513 outputs the level difference signal to the inverter 514 and the switch 515. The device 514 inverts the output signal of the calculator 513. The inverter 514 outputs the inversion-resultant signal to the switch 515.

The provisional determination circuit 516 provisionally determines which of "+1", "0", and "−1" the value represented by the output signal of the delay element 511 is equal to. The provisional determination circuit 516 generates a switch control signal in response to the provisional determination result. The provisional determination circuit 516 outputs the switch control signal to the switch 515.

The signal outputted from the calculator 513 to the switch 515 is referred to as a first error signal. The signal outputted from the inverter 514 to the switch 515 is referred to as a second error signal. The switch 515 is fed with a third error signal (not shown) corresponding to a provisional determination result of "0". The switch 515 selects one among the first, second, and third error signals in accordance with the switch control signal. The switch 515 outputs the selected error signal to the D/A converter 505 as a final error signal.

In the provisional determination device 504 of FIG. 2, the calculator 513 computes the level difference between signal samples immediately preceding and immediately following a signal sample currently subjected to the provisional determination by the circuit 516. The error signal outputted from the provisional determination device 504 is generated through the provisional determination regarding the value of the output signal of the A/D converter 501, that is, the before-equalization signal. The provisional determination circuit 516 implements the provisional determination according to an algorithm of maximum-likelihood detection using a correlation between signal components. The provisional determination circuit 516 provisionally determines the likeliest signal value "1" or "−1" for a signal sample of interest, and signal samples immediately preceding and immediately following the signal sample of interest are used for the generation of the error signal.

The prior-art apparatus of FIG. 1 includes the analog VCO 507. The analog VCO 507 occupies a great space. Therefore, the prior-art apparatus of FIG. 1 tends to be large in size.

Figure 3:
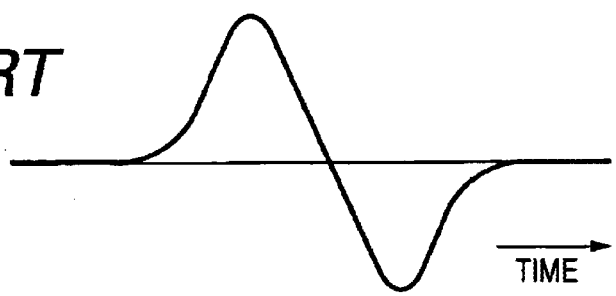
FIG. 3 is a time-domain diagram of an example of a differential-type isolated waveform.
Figure 4:
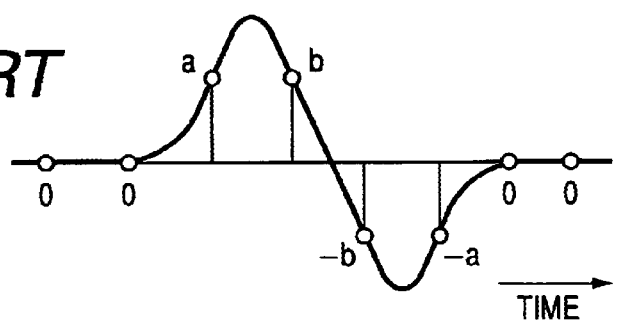
FIG. 4 is a time-domain diagram of a waveform (an equalization-resultant waveform) which results from equalization of the differential-type isolated waveform in FIG. 3.
Figure 5:
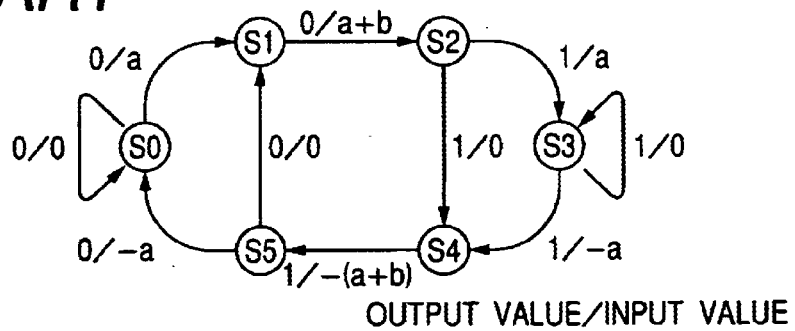
FIG. 5 is a diagram of signal state transitions regarding a partial-response (PR) characteristic and a run-length-limited (RLL) code corresponding to PR (a, b, −b, −a) and RLL (1, X) respectively.

Partial-response (PR) characteristics will be explained below. When an impulse response waveform in FIG. 3 is subjected to equalization accorded with the characteristic of PR (a, b, −b, −a), the equalization-resultant waveform in FIG. 4 is provided. A waveform resulting from the PR (a, b, −b, −a) equalization of a continuous waveform takes one of five different values, that is, "−(a+b)", "−a", "0", "a", and "a+b". It is assumed that the 5-value signal of a (1, X) run-length-limited code is inputted into a viterbi decoder. Here, the (1, X) run-length-limited code is prescribed by run-length limiting rules such that the minimum transition interval is equal to "2", and the maximum transition interval is equal to a given value X depending on the modulation format. The (1, X) runlength-limited code is also denoted as RLL (1, X). The state of a current sample of an original signal (an input value) and the state of a current sample of a reproduced signal (an output value) resulting from PR equalization are restricted by the states of previous samples. In the input signal, two successive samples of "1" will not occur. FIG. 5 shows signal state transitions available in this case.

In FIG. 5, S0, S1, S2, S3, S4, and S5 denote signal states determined by immediately-preceding output values. Transitions from the state S2 will be taken as an example. When the input value is "a", the output value becomes "1" and a transition to the state S3 from the state S2 occurs. When the input value is "0", the output value becomes "1" and a transition to the state S4 from the state S2 occurs. Under normal conditions, regarding the state S2, the input value different from "a" and "0" does not occur. Thus, the input value different from "a" and "0" is an error.

Figure 6:
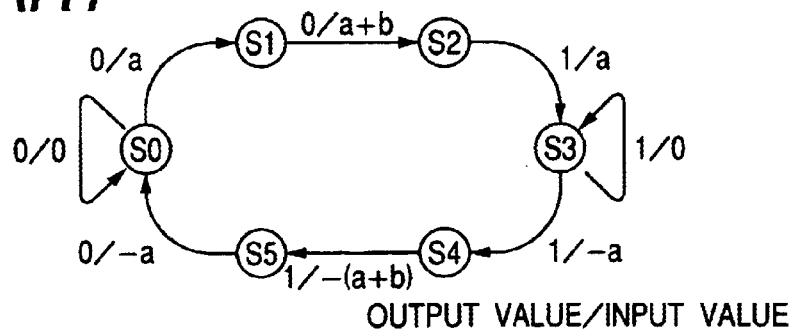
FIG. 6 is a diagram of signal state transitions regarding a partial-response (PR) characteristic and a run-length-limited (RLL) code corresponding to PR (a, b, −b, −a) and RLL (2, X) respectively.

FIG. 6 shows signal state transitions available in the case of a (2, X) run-length-limited code rather than the (1, X) run-length limited code. Here, the (2, X) run-length-limited code is prescribed by run-length limiting rules such that the minimum transition interval is equal to "3", and the maximum transition interval is equal to a given value X depending on the modulation format. The (2, X) run-length-limited code is also denoted as RLL (2, X). The signal state transitions in FIG. 6 include neither a transition from the state S5 to the state S1 nor a transition from the state S2 to the state S4.

Figure 7:
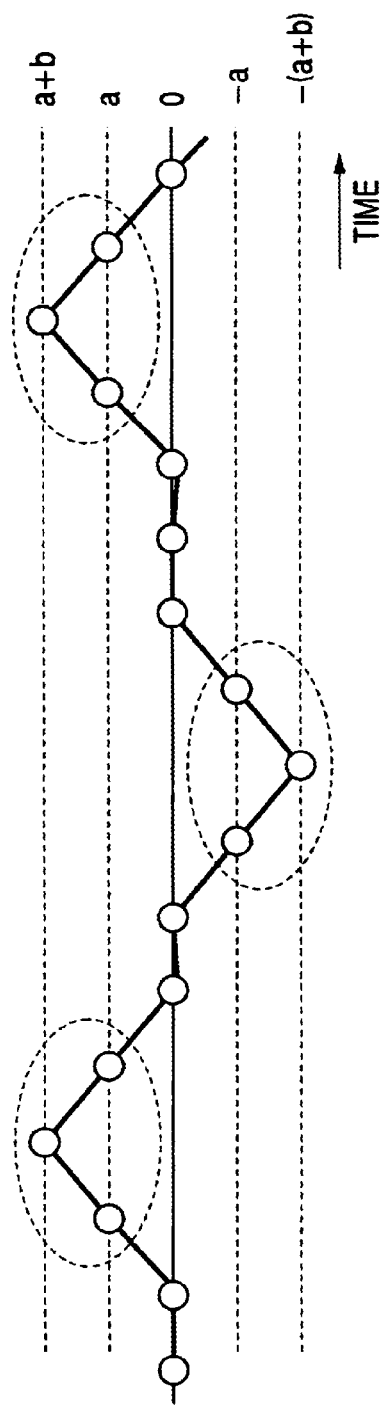
FIG. 7 is a time-domain diagram showing an example of the waveform of an ideal reproduced signal.
Figure 8:
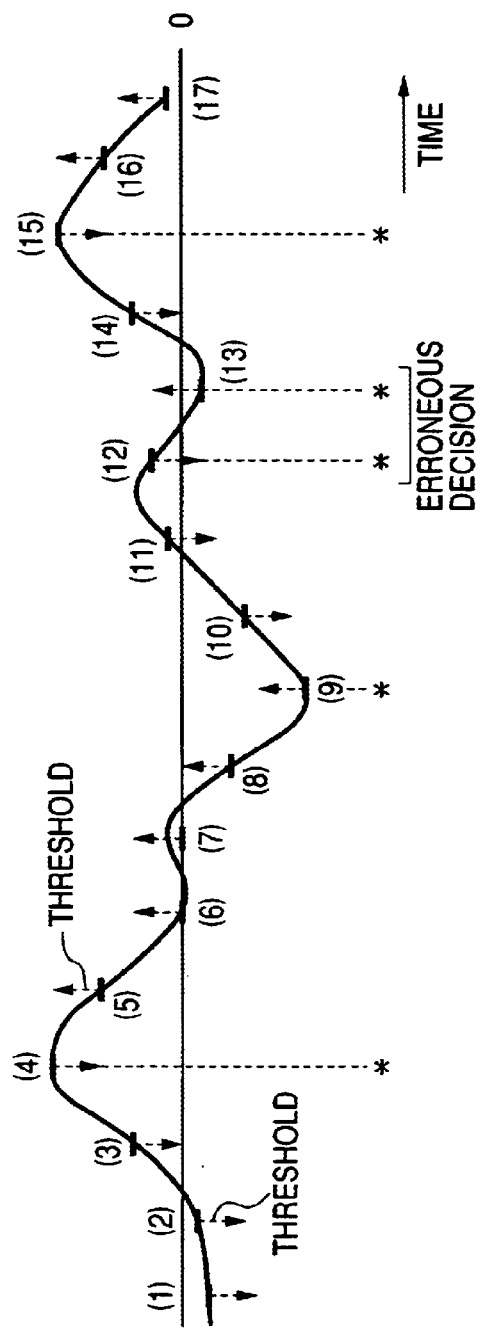
FIG. 8 is a time-domain diagram showing an example of the waveform of an actual reproduced signal which corresponds to the ideal reproduced signal in FIG. 7.

FIG. 7 shows an example of the waveform of an ideal reproduced signal having state transitions accorded with those in FIG. 5 or FIG. 6. The ideal reproduced signal occurs under conditions where noise is absent and a system does not cause distortion. FIG. 8 shows an example of the waveform of an actual reproduced signal which corresponds to the ideal reproduced signal in FIG. 7, and which is affected by noise and is distorted by a system.

A prior-art provisional determination will be explained below. With reference to FIG. 8, the reproduced signal is periodically sampled at moments (1), (2), . . . , and (17). In FIG. 8, the character "*" denotes a detected positive peak signal sample or a detected negative peak signal sample (a detected valley signal sample). Here, "peak signal sample" means "peak-corresponding signal sample" or "signal sample at which signal level peaks". It is assumed that at the moment (1), the level of a signal sample which occurs at a sampling moment preceding the moment (1) is decided to a negative peak value (a valley value). In this case, at the moment (1), a threshold level (a reference level) is set to a given negative-direction value to detect a next positive peak signal sample.

At the moment (2), the level of the present signal sample is closer to the positive peak value than the level of the signal sample at the moment (1) is. Thus, the level difference between the two signal samples immediately preceding and immediately following the signal sample at the moment (2) is stored as preparations for outputting phase error data corresponding to a positive peak signal sample which will be decided next. In addition, the threshold level is updated.

At the moments (3) and (4), processes similar to those at the moment (2) are implemented.

At the moment (5), the level of the present signal sample exceeds the threshold level so that the stored level difference between the two signal samples immediately preceding and immediately following the signal sample at the moment (4) is outputted as phase error data corresponding to a positive peak signal sample. In addition, the level difference between the two signal samples immediately preceding and immediately following the signal sample at the moment (5) is stored as preparations for outputting phase error data corresponding to a negative peak signal sample (a valley signal sample) which will be decided next. Furthermore, the threshold level is set to a given positive-direction value to detect a next negative peak signal sample.

At the moment (7), the level of the present signal sample does not exceed the threshold level provided at the moment (6) although it is higher than than the level of the signal sample at the moment (6). In this case, the stored phase error data are prevented from being updated. Specifically, the level difference between the two signal samples immediately preceding and immediately following the signal sample at the moment (6) remain stored as the phase error data for a negative peak signal sample which will be decided next. Thus, the past phase error data remain stored.

Accordingly, it is possible to output a likely phase error signal even when the waveform varies through a small positive peak (a noise-caused or distortion-caused false peak) as shown by the time range including the moments (6) and (7).

As previously mentioned, the waveform takes one of the five different values, that is, "−(a+b)", "−a", "0", "a", and "a+b". In this case, the level differences between every peak point to be detected and signal samples immediately adjacent thereto are relatively small. Accordingly, the threshold value is set small so as to accurately discriminate every peak point from adjacent signal samples. The small threshold value causes the following problem. In the time range between the moments (11) and (14), the waveform varies around the "0" level through an intermediate positive peak and an intermediate negative peak (noise-caused or distortion-caused false peaks). The signal sample at the moment (12) is erroneously decided to be a positive peak signal sample. In addition, the signal sample at the moment (13) is erroneously decided to be a negative peak signal sample.

First Embodiment

Figure 9:
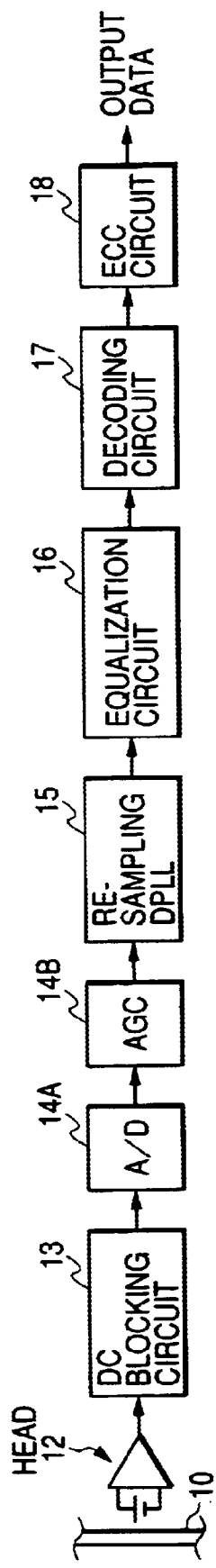
FIG. 9 is a block diagram of an information reproducing apparatus according to a first embodiment of this invention.

FIG. 9 shows an information reproducing apparatus according to a first embodiment of this invention. With reference to FIG. 9, an optical disc 10 stores a signal of a run-length-limited code at a predetermined high recording density. An optical head 12 reads out the signal of the run-length-limited code from the optical disc 10 in a suitable method such as a tangential push-pull method. The read-out signal has a waveform of a differential type. The optical head 12 outputs the read-out signal to a direct-current blocking circuit (a DC blocking circuit) 13. The optical head 12 includes a photodetector, and an amplifier following the photodetector.

The circuit 13 blocks a direct-current component (a DC component) of the read-out signal, and passes only alternating-current components (AC components) thereof. The output signal of the DC blocking circuit 13 is applied to an A/D (analog-to-digital) converter 14A. The A/D converter 14A changes the output signal of the DC blocking circuit 13 into a corresponding digital signal. Specifically, the A/D converter 14A periodically samples the output signal of the DC blocking circuit 13 in response to a system clock signal, and converts every resultant sample into a digital sample. The A/D converter 14A outputs the digital signal, that is, a sequence of the digital samples, to a digital AGC (automatic gain control) circuit 14B. The AGC circuit 14B subjects the output signal of the A/D converter 14A to automatic gain control for providing a constant signal amplitude on a digital basis. The AGC circuit 14B outputs the resultant digital signal to a re-sampling DPLL section 15. The output signal of the AGC circuit 14B is referred to as a first digital signal. The position of the A/D converter 14A may be between the AGC circuit 14B and the re-sampling DPLL section 15, or between the optical head 12 and the DC blocking circuit 13.

The re-sampling DPLL section 15 converts the output signal (the first digital signal) of the AGC circuit 14B into a second digital signal by a re-sampling process at a desired bit rate. Specifically, the re-sampling DPLL section 15 includes a digital PLL (phase locked loop) circuit having a closed loop. The digital PLL circuit in the re-sampling DPLL section 15 generates samples of the second digital signal from samples of the output signal of the AGC circuit 14B through a PLL re-sampling process based on at least one of interpolation and decimation. The re-sampling DPLL section 15 outputs the second digital signal to an adaptive equalization circuit 16.

The adaptive equalization circuit 16 subjects the output signal of the re-sampling DPLL section 15 to automatic waveform equalization which corresponds to a process of providing the signal in question with a partial-response (PR) characteristic. The adaptive equalization circuit 15 outputs the equalization-resultant signal to a decoding circuit 17. The decoding circuit 17 recovers original data from the output signal of the adaptive equalization circuit 16 through a viterbi decoding process. The decoding circuit 17 outputs the recovered data to an ECC (error checking and correcting) circuit 18. The ECC circuit 18 extracts an error correction code from the recovered data outputted by the decoding circuit 17. The ECC circuit 18 corrects errors in the recovered data in response to the error correction code. The ECC circuit 18 outputs the resultant recovered data.

Figure 10:
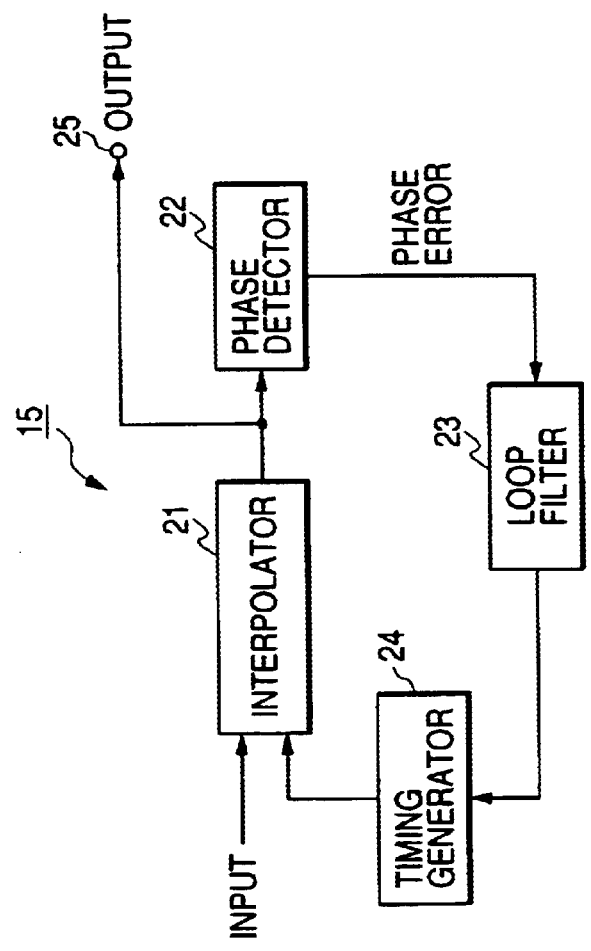
FIG. 10 is a block diagram of a re-sampling DPLL section in FIG. 9.

As shown in FIG. 10, the re-sampling DPLL section 15 includes an interpolator 21, a phase detector 22, a loop filter 23, and a timing signal generator 24 which are connected in a closed loop in that order. The interpolator 21 receives the output signal of the AGC circuit 14B. The interpolator 21 receives data point phase information and a bit clock signal from the timing signal generator 24. The interpolator 21 estimates phase-point data samples of the second digital signal from samples of the output signal of the AGC circuit 14B through interpolation responsive to the data point phase information and the bit clock signal. Here, "phase" is defined relative to the bit clock signal. The sample estimation by the interpolator 21 corresponds to re-sampling. The interpolator 21 outputs the estimated phase-point data samples to the phase detector 22. Also, the interpolator 21 outputs the estimated phase-point data samples to the adaptive equalization circuit 16 via an output terminal 25 as the second digital signal.

In the re-sampling DPLL section 15, the phase detector 22 generates a phase error signal from the phase-point data samples of the second digital signal. The phase detector 22 outputs the phase error signal to the loop filter 23. The loop filter 23 integrates the phase error signal. The loop filter 23 outputs the integration-resultant signal to the timing signal generator 24. The timing signal generator 24 produces the data point phase information and the bit clock signal in response to the output signal of the loop filter 23. Thus, the data point phase information and the bit clock signal are controlled in response to the phase error signal. This control is designed to implement frequency and phase lock by which the bit clock signal is locked in phase with the first digital signal (the output signal of the AGC circuit 14B).

The phase detector 22 provisionally determines the likeliest value of every sample of the second digital signal according to maximum-likelihood detection using a correlation between signal components. The phase detector 22 calculates the amplitude error (balance) between samples immediately preceding and immediately following the sample of interest in response to the provisional determination results. The phase detector 22 generates the phase error signal from the calculated amplitude error.

Figure 11:
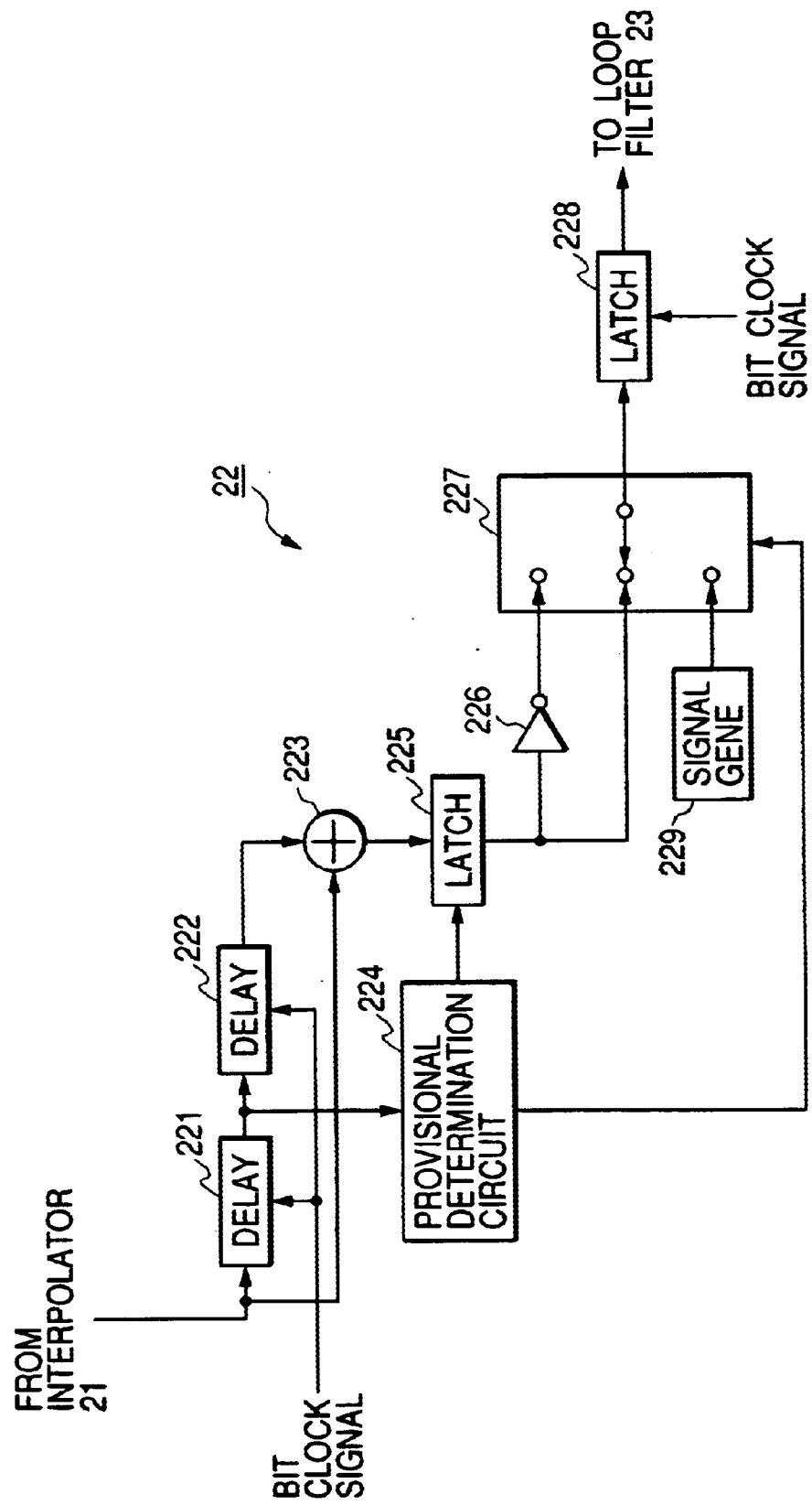
FIG. 11 is a block diagram of a phase detector in FIG. 10.

As shown in FIG. 11, the phase detector 22 includes delay elements 221 and 222, a calculator 223, a provisional determination circuit 224, a latch 225, an inverter 226, a switch 227, a latch 228, and a signal generator 229.

The input terminal of the delay element 221 is connected to the output terminal of the interpolator 21. The output terminal of the delay element 221 is connected to the input terminal of the delay element 222 and also the input terminal of the provisional determination circuit 224. The output terminal of the delay element 222 is connected to a first input terminal of the calculator 223. A second input terminal of the calculator 223 is connected to the output terminal of the interpolator 21. The output terminal of the calculator 223 is connected to the input terminal of the latch 225. The output terminal of the latch 225 is connected to the input terminal of the inverter 226. The output terminal of the inverter 226 is connected to a first fixed contact of the switch 227. The output terminal of the latch 225 is directly connected to a second fixed contact of the switch 227. The latch 225 has an enabling terminal connected to a first output terminal of the provisional determination circuit 224. The output terminal of the signal generator 229 is connected to a third fixed contact of the switch 227. The switch 227 has a control terminal connected to a second output terminal of the provisional determination circuit 224. The switch 227 has a movable contact which connects with one of the first, second, and third fixed contacts thereof in response to a signal applied to the control terminal. The movable contact of the switch 227 is connected to the input terminal of the latch 228. The output terminal of the latch 228 is connected to the input terminal of the loop filter 23.

The delay element 221 receives the output signal of the interpolator 21 (the second digital signal). The delay element 221 responds to the bit clock signal. The delay element 221 defers the output signal of the interpolator 21 by a 1-sample interval or a 1-bit-corresponding interval determined by the bit clock signal. The output signal of the delay element 221 is applied to the delay element 222 and the provisional determination circuit 224. The delay element 222 responds to the bit clock signal. The delay element 222 defers the output signal of the delay element 221 by the 1-sample interval or the 1-bit-corresponding interval. The output signal of the delay element 222 is applied to the calculator 223. The calculator 223 receives the output signal of the interpolator 21 (the second digital signal). The calculator 223 computes the level difference between the output signal of the interpolator 21 and the output signal of the delay element 222. The calculator 223 generates a signal representing the computed level difference. The calculator 223 outputs the level difference signal to the latch 225.

The provisional determination circuit 224 provisionally determines which of digital multiple values (for example, "−(a+b)", "−a", "0", "a", and "a+b") the value represented by the output signal of the delay element 221 is equal to at the highest possibility. The provisional determination circuit 224 generates first and second control signals depending on the result of the provisional determination. The provisional determination circuit 224 outputs the first control signal to the latch 225 as an enabling signal. The provisional determination circuit 224 outputs the second control signal to the switch 227 as a switch control signal.

In the phase detector 22 of FIG. 11, the calculator 223 computes the level difference between signal samples immediately preceding and immediately following a signal sample currently subjected to the provisional determination by the circuit 224. The calculator 223 outputs the level difference signal to the latch 225.

The latch 225 periodically samples and holds the output signal of the calculator 223 in response to the bit clock signal. The latch 225 is selectively enabled and disabled in response to the first control signal fed from the provisional determination circuit 224. For example, the first control signal has one bit. The first control signal is set to "0" when the provisional determination circuit 224 judges that a signal sample of interest corresponds to a false peak (a false positive peak or a false negative peak, that is, a false valley). Otherwise, the first control signal is set to "1". The latch 225 is enabled and hence the signal held by the latch 225 is updated when the first control signal is "1". The latch 225 is disabled when the first control signal is "0". When the latch 225 is disabled, the signal held by the latch 225 is inhibited from being updated. Accordingly, in this case, the signal continues to be held by the latch 225 until the first control signal returns to "1". As understood from the above description, the signal held by the latch 225 is inhibited from being updated for a false peak-corresponding signal sample.

The inverter 226 receives the output signal of the latch 225. The device 226 inverts the output signal of the latch 225, and outputs the inversion-resultant signal to the first fixed contact of the switch 227. The second fixed contact of the switch 227 receives the output signal of the latch 225. The signal generator 229 supplies the third fixed contact of the switch 227 with a predetermined signal (a "0" phase error signal) which corresponds to a condition where the phase error is null. The movable contact of the switch 227 connects with one of the first, second, and third fixed contacts thereof in response to the switch control signal fed from the provisional determination circuit 224. Thus, the switch 227 selects one among the output signal of the inverter 226, the output signal of the latch 225, and the output signal of the signal generator 229 in response to the switch control signal. The switch 227 transmits the selected signal to the latch 228. The device 228 periodically latches the signal from the switch 227 in response to the bit clock signal. The latch 228 outputs the resultant signal to the loop filter 23 as the phase error signal.

Figure 12:
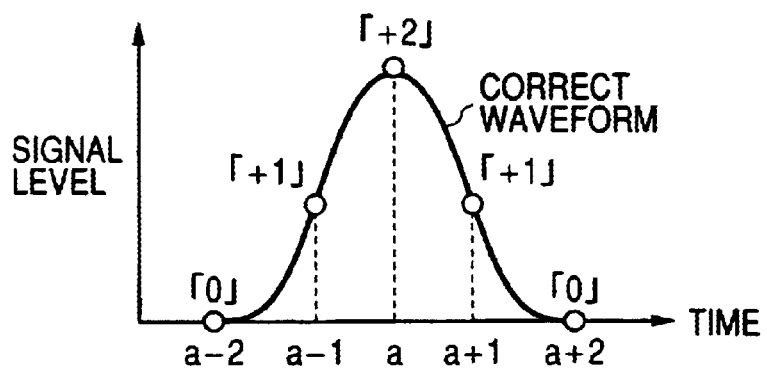
FIG. 12 is a time-domain diagram of a signal waveform corresponding to a digital value sequence of "0→+1→+2→+1→0" which is free from a phase error relative to sampling moments.

FIG. 12 shows the waveform of a signal corresponding to a digital information signal which is "0", "+1", "+2", "+1", and "0" at five successive sampling moments in the absence of a signal phase error relative to the timing of the re-sampling by the interpolator 21. With reference to FIG. 12, at a first re-sampling moment "a−2", the signal level is zero and a signal state of "0" is detected. At a second re-sampling moment "a−1", the signal level is slightly greater than zero and a signal state of "+1" is detected. At a third re-sampling moment "a", the signal level is considerably greater than zero and a signal state of "+2" is detected. At a fourth re-sampling moment "a+1", the signal level is slightly greater than zero and a signal state of "+1" is detected. At a fifth re-sampling moment "a+2", the signal level is zero and a signal state of "0" is detected. Thus, in FIG. 12, the difference between the signal levels, which occur at the re-sampling moments "a−1" and "a+1" immediately preceding and immediately following the peak-corresponding re-sampling moment "a", is equal to zero.

Figure 13:
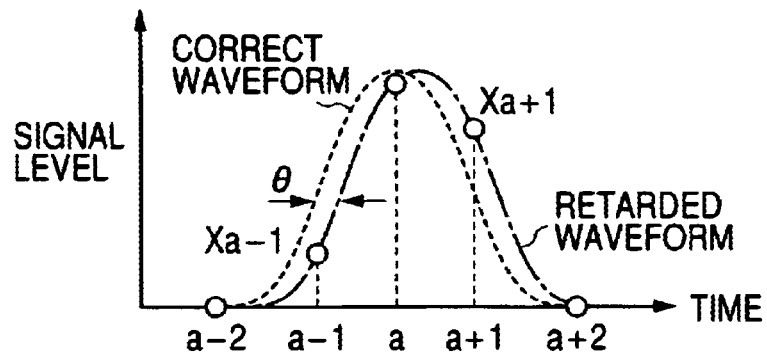
FIG. 13 is a time-domain diagram of a signal waveform corresponding to a digital value sequence of "0→+1→+2→+1→0" which has a phase retardation relative to sampling moments.

FIG. 13 shows the waveform of a signal corresponding to a digital information signal which is "0", "+1", "+2", "+1", and "0" at five successive sampling moments in the presence of a signal phase retardation relative to the re-sampling timing by a value "θ". With reference to FIG. 13, the signal level Xa−1 at a second re-sampling moment "a−1" deviates from true one in a smaller side. The signal level Xa+1 at a fourth re-sampling moment "a+1" deviates from true one in a greater side. In the case where the signal level at a third re-sampling moment "a" is provisionally judged to be "+2" (a peak), the difference "Xa−1−Xa+1" between the signal levels Xa−1 and Xa+1, which occur at the re-sampling moments "a−1" and "a+1" immediately preceding and immediately following the peak-corresponding re-sampling moment "a", is different from zero.

Figure 14:
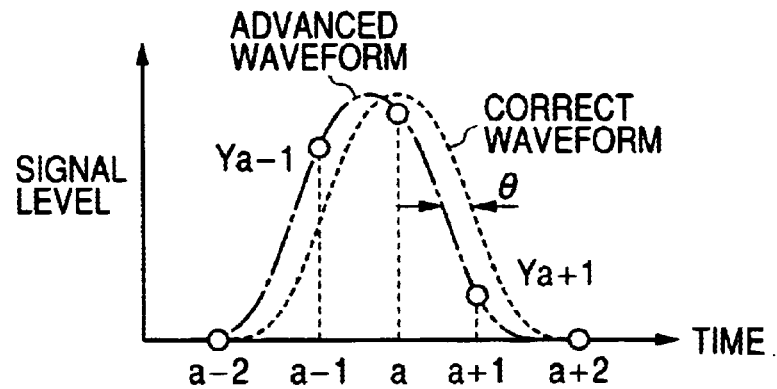
FIG. 14 is a time-domain diagram of a signal waveform corresponding to a digital value sequence of "0→+1→+2→+1→0" which has a phase advance relative to sampling moments.

FIG. 14 shows the waveform of a signal corresponding to a digital information signal which is "0", "+1", "+2", "+1", and "0" at five successive sampling moments in the presence of a signal phase advance relative to the re-sampling timing by a value "θ". With reference to FIG. 14, the signal level Ya−1 at a second re-sampling moment "a−1" deviates from true one in a greater side. The signal level Ya+1 at a fourth re-sampling moment "a+1" deviates from true one in a smaller side. In the case where the signal level at a third re-sampling moment "a" is provisionally judged to be "+2" (a peak), the difference "Ya−1−Ya+1" between the signal levels Ya−1 and Ya+1, which occur at the re-sampling moments "a−1" and "a+1" immediately preceding and immediately following the peak-corresponding re-sampling moment "a", is different from zero.

As understood from FIGS. 12, 13, and 14, the signal phase error can be detected on the basis of the difference between the signal levels which occur at the second and fourth sampling moments "a−1" and "a+1" in cases where a signal state of "+2" (a positive peak state) is detected at the third sampling moment "a". Similarly, the signal phase error can be detected on the basis of the difference between the signal levels which occur at the second and fourth sampling moments "a−1" and "a+1" in cases where a signal state of "−2" (a negative peak state or a valley state) is detected at the third sampling moment "a". Based on these facts, the phase detector 22 senses the phase error between a digital information signal and the re-sampling timing (the bit clock signal). The phase detector 22 generates a signal representing the detected phase error. The phase detector 22 outputs the phase error signal to the loop filter 23.

In the phase detector 22 of FIG. 11, the calculator 223 computes the difference between the signal levels at the second and fourth sampling moments "a−1" and "a+1". The provisional determination circuit 224 decides whether or not the signal level at the third sampling moment "a" is one of "+2" and "−2", that is, whether or not the signal level at the third sampling moment "a" corresponds to one of a positive peak and a negative peak (a valley). The latch 225, the inverter 226, the switch 227, the latch 228, and the signal generator 229 operate to implement the following process. When the provisional determination circuit 224 decides that the signal level at the third sampling moment "a" corresponds to one of a positive peak and a negative peak (a valley), the computed difference between the signal levels at the second and fourth sampling moments "a−1" and "a+1" is used in generating the phase error signal outputted from the phase detector 22.

The provisional determination circuit 224 decides whether every peak-corresponding sample represented by the output signal of the delay element 221 is true or false according to an algorithm of maximum-likelihood detection using a correlation between signal components. Here, "true" includes "likely" and "likelier". A false peak is caused by, for example, noise having no correlation with signal components. The provisional determination circuit 224 is designed to implement the following processes. In the case where a first signal level corresponding to a probable positive peak is detected at a first re-sampling moment and then a second signal level higher than the first signal level is detected at a second re-sampling moment (the next re-sampling moment), the second re-sampling moment rather than the first re-sampling moment is decided to be in correspondence with a true positive peak or a likelier positive peak. On the other hand, in the case where a first signal level corresponding to a probable positive peak is detected at a first re-sampling moment and then a second signal level lower than the first signal level is detected at a second re-sampling moment (the next re-sampling moment), the first re-sampling moment rather than the second re-sampling moment is decided to be in correspondence with a true positive peak or a likelier positive peak. In the case where a first signal level corresponding to a probable negative peak is detected at a first re-sampling moment and then a second signal level lower than the first signal level is detected at a second re-sampling moment before a third signal level lower than the second signal level is detected at a third re-sampling moment, the second re-sampling moment is decided to be in correspondence with a false peak. Through these processes, the provisional determination circuit 224 detects every likeliest positive-peak-corresponding sample and every likeliest negative-peak-corresponding sample represented by the output signal of the delay element 221. Even under conditions where signal levels along a steep waveform are changed from original ones by noise or distortion due to inter-symbol interferences, the provisional determination circuit 224 reliably decides every likeliest positive-peak-corresponding sample and every likeliest negative-peak-corresponding sample.

Figure 15:
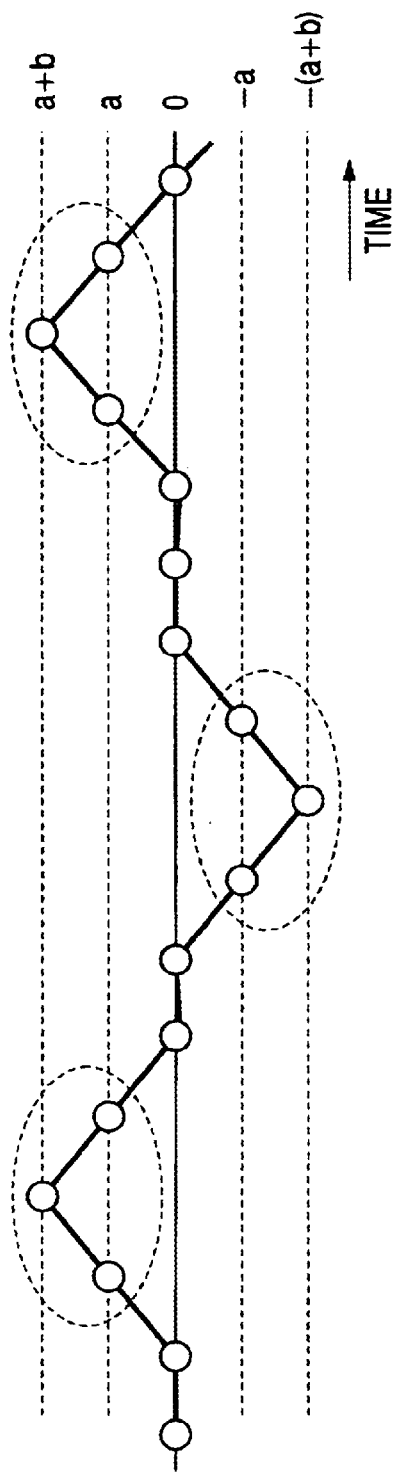
FIG. 15 is a time-domain diagram showing an example of the waveform of an ideal reproduced signal.
Figure 16:
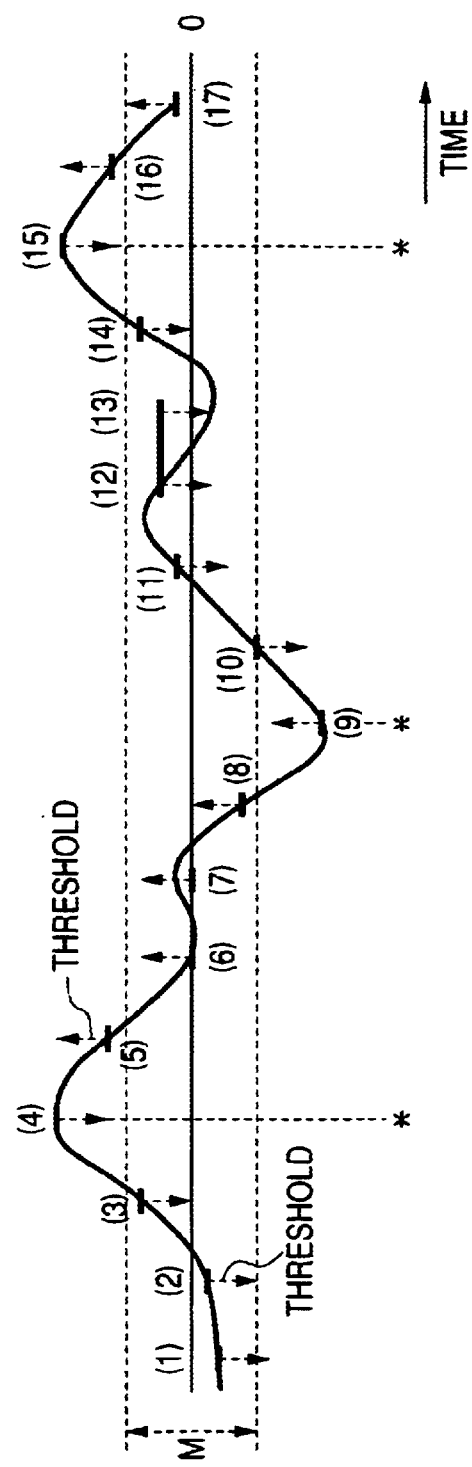
FIG. 16 is a time-domain diagram showing an example of the waveform of an actual reproduced signal which corresponds to the ideal reproduced signal in FIG. 15.

FIG. 15 shows an example of the waveform of an ideal reproduced signal having state transitions accorded with those in FIG. 5 or FIG. 6. The ideal reproduced signal occurs under conditions where noise is absent and a system does not cause distortion. FIG. 16 shows an example of the waveform of an actual reproduced signal which corresponds to the ideal reproduced signal in FIG. 15, and which is affected by noise and is distorted by a system.

The operation of the provisional determination circuit 224 will be further explained below. With reference to FIG. 16, the reproduced signal is periodically sampled at moments (1), (2), ..., and (17). In FIG. 16, the character "*" denotes a detected positive peak signal sample or a detected negative peak signal sample (a detected valley signal sample). It is assumed that at the moment (1), the level of a signal sample which occurs at a sampling moment preceding the moment (1) is decided to a negative peak value (a valley value). In this case, at the moment (1), a threshold level (a reference level) is set to a given negative-direction value to detect a next positive peak signal sample.

At the moment (2), the level of the present signal sample is closer to the positive peak value than the level of the signal sample at the moment (1) is. Thus, the level difference between the two signal samples immediately preceding and immediately following the signal sample at the moment (2) is stored in the latch 225 as preparations for outputting phase error data corresponding to a positive peak signal sample which will be decided next. Specifically, at the moment (2), the provisional determination circuit 224 outputs a control signal of "1" (an enabling signal) to the latch 225 to update the signal latched thereby. In addition, the provisional determination circuit 224 outputs a control signal to the switch 227 to select the output signal of the signal generator 229, that is, the "0" phase error signal. In this case, the output signal of the signal generator 229 is transmitted via the switch 227 to the latch 228, being latched thereby. The output signal of the latch 228 is fed to the loop filter 23 as the phase error signal.

At the moments (3) and (4), processes similar to those at the moment (2) are implemented.

At the moment (5), the level of the present signal sample exceeds the threshold level so that the stored level difference between the two signal samples immediately preceding and immediately following the signal sample at the moment (4) is transmitted from the latch 225 and is outputted as phase error data corresponding to a positive peak signal sample. In addition, the level difference between the two signal samples immediately preceding and immediately following the signal sample at the moment (5) is stored in the latch 225 as preparations for outputting phase error data corresponding to a negative peak signal sample (a valley signal sample) which will be decided next. Specifically, at the moment (5), the provisional determination circuit 224 outputs a control signal of "1" (an enabling signal) to the latch 225 to update the signal latched thereby. In addition, the provisional determination circuit 224 outputs a control signal to the switch 227 to select the output signal of the latch 225, that is, the level difference between the two signal samples immediately preceding and immediately following the signal sample at the moment (4). In this case, the output signal of the latch 225 is transmitted via the switch 227 to the latch 228, being latched thereby. The output signal of the latch 228 is fed to the loop filter 23 as the phase error signal. Furthermore, the threshold level is set to a given positive-direction value to detect a next negative peak signal sample.

At the moment (7), the level of the present signal sample does not exceed the threshold level provided at the moment (6) although it is higher than the level of the signal sample at the moment (6). In this case, the stored phase error data are prevented from being updated. Specifically, the level difference between the two signal samples immediately preceding and immediately following the signal sample at the moment (6) remain stored as the phase error data for a negative peak signal sample which will be decided next. Thus, the past phase error data remain stored. In more detail, at the moment (7), the provisional determination circuit 224 outputs a control signal of "0" (a disabling signal) to the latch 225 to inhibit the updating of the signal latched thereby. In addition, the provisional determination circuit 224 outputs a control signal to the switch 227 to select the output signal of the signal generator 229, that is, the "0" phase error signal. In this case, the output signal of the signal generator 229 is transmitted via the switch 227 to the latch 228, being latched thereby. The output signal of the latch 228 is fed to the loop filter 23 as the phase error signal.

A feature of the operation of the provisional determination circuit 224 is as follows. The provisional determination circuit 224 decides whether every detected peak signal sample is true or false. Here, "true" includes "likely" and "likelier". Specifically, the provisional determination circuit 224 decides whether or not the level of every detected peak signal sample is in a prescribed range M containing the "0" level or centered at the "0" level (see FIG. 16). The provisional determination circuit 224 invalidates each detected peak signal sample whose level is in the prescribed range M. In other words, the provisional determination circuit 224 judges that each detected peak signal sample whose level is in the prescribed range M is false. On the other hand, the provisional determination circuit 224 judges that each detected peak signal sample whose level is outside the prescribed range M is true. The provisional determination circuit 224 excludes false peak signal samples from the generation of the phase error signal outputted from the phase detector 22. Thus, only true peak signal samples are used in the generation of the phase error signal.

The featuring operation of the provisional determination circuit 224 will be explained below in more detail. With reference to FIG. 16, at the moment (13), the level of the present signal sample exceeds the threshold level provided at the moment (12) and is lower than that of the signal sample at the moment (12). The level of the present signal sample is in the prescribed range M. Thus, the provisional determination circuit 224 decides that the present signal sample does not correspond to a negative peak (a valley). Specifically, at the moment (13), the provisional determination circuit 224 outputs a control signal of "0" (a disabling signal) to the latch 225 to inhibit the updating of the signal latched thereby. In addition, the provisional determination circuit 224 outputs a control signal to the switch 227 to select the output signal of the signal generator 229, that is, the "0" phase error signal. In this case, the output signal of the signal generator 229 is transmitted via the switch 227 to the latch 228, being latched thereby. The output signal of the latch 228 is fed to the loop filter 23 as the phase error signal. Furthermore, the threshold level is prevented from being set to a given positive-direction value.

At the moment (14), the level of the present signal sample is closer to the positive peak value than the level of the signal sample at the moment (13) is. Thus, the level difference between the two signal samples immediately preceding and immediately following the signal sample at the moment (14) is stored in the latch 225 as preparations for outputting phase error data corresponding to a positive peak signal sample which will be decided next. Specifically, at the moment (14), the provisional determination circuit 224 outputs a control signal of "1" (an enabling signal) to the latch 225 to update the signal latched thereby. In addition, the provisional determination circuit 224 outputs a control signal to the switch 227 to select the output signal of the signal generator 229, that is, the "0" phase error signal. In this case, the output signal of the signal generator 229 is transmitted via the switch 227 to the latch 228, being latched thereby. The output signal of the latch 228 is fed to the loop filter 23 as the phase error signal.

According to the featuring operation of the provisional determination circuit 224, signal samples whose levels are in the prescribed range M are prevented from being detected as true peak signal samples. Therefore, it is possible to provide a more reliable phase error signal at a minimum delay with respect to a waveform based on 5-value or more-value partial-response characteristics.

Figure 17:
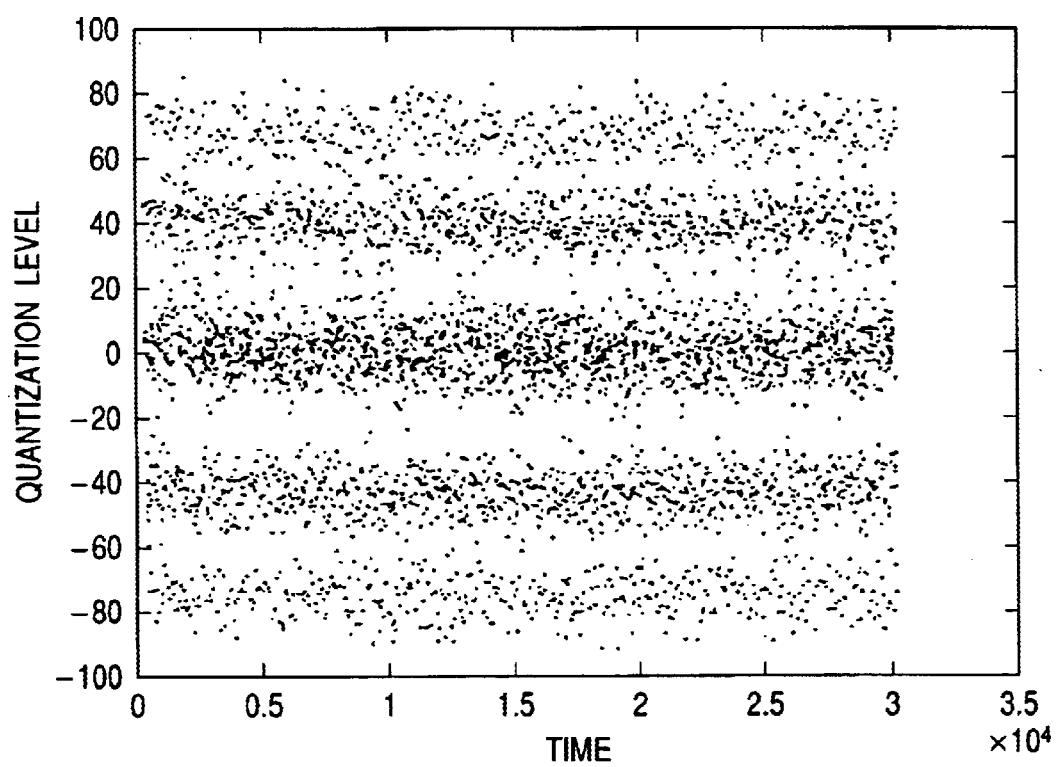
FIG. 17 is a time-domain diagram of signal samples outputted from the re-sampling DPLL section in FIG. 9.
Figure 18:
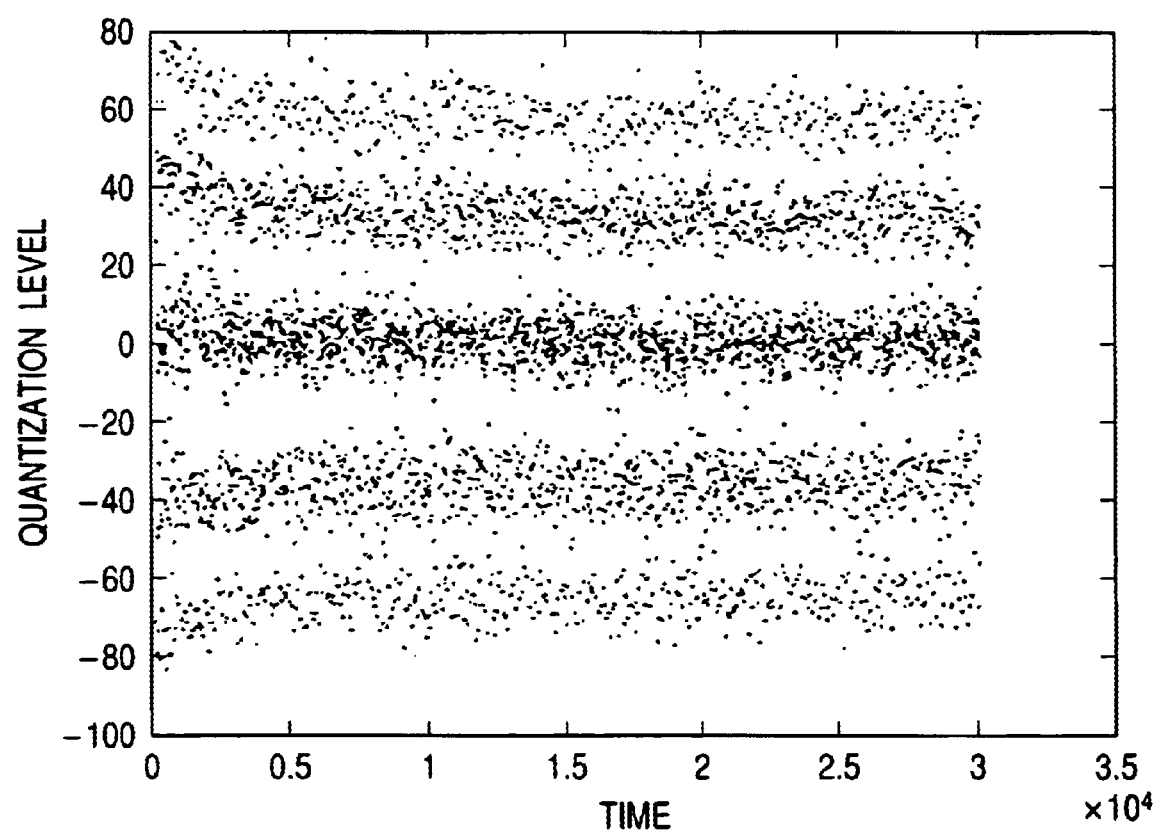
FIG. 18 is a time-domain diagram of signal samples outputted from an adaptive equalization circuit in FIG. 9.

Experiments were carried out. During the experiments, a test signal of RLL (2, X) was inputted into the information reproducing apparatus of FIG. 9 for PR (a, b, −b, −b). The test signal was processed by the information reproducing apparatus. FIG. 17 shows time-domain conditions of the output signal of the re-sampling DPLL section 15 which originated from the test signal. FIG. 18 shows time-domain conditions of the output signal of the adaptive equalization circuit 16 which originated from the test signal. In each of FIGS. 17 and 18, the abscissa denotes time elapsed, and the ordinate denotes the quantization levels of signal samples. As shown in FIGS. 17 and 18, digital signals free from DC fluctuations and accurately separated into five groups corresponding to levels of "a+b", "a", "0", "−a", and "−(a+b)" were reproduced with the aid of correct phase detection.

Figure 19:
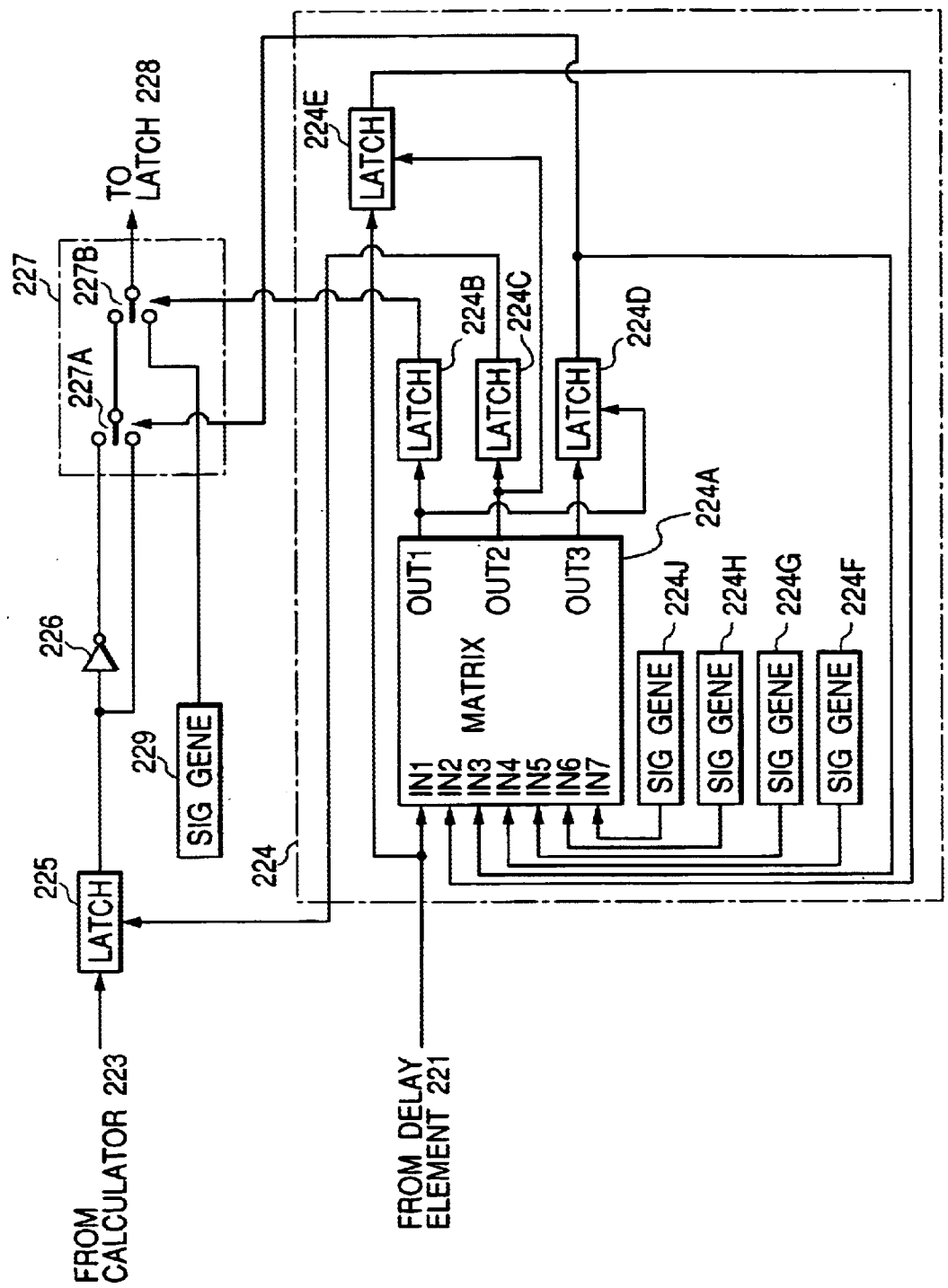
FIG. 19 is a block diagram of a provisional determination circuit and a switch in FIG. 11.

FIG. 19 shows an example of the provisional determination circuit 224 and the switch 227 in FIG. 11. The provisional determination circuit 224 of FIG. 19 includes a matrix circuit 224A, latches 224B, 224C, 224D, and 224E, and signal generators 224F, 224G, 224H, and 224J. The matrix circuit 224A has input terminals IN1, IN2, IN3, IN4, IN5, IN6, and IN7, and output terminals OUT1, OUT2, and OUT3. The input terminal IN1 of the matrix circuit 224A is connected to the output terminal of the delay element 221. Also, the input terminal of the latch 224E is connected to the output terminal of the delay element 221. The input terminals IN4, IN5, IN6, and IN7 of the matrix circuit 224A are connected to the output terminals of the signal generators 224F, 224G, 224H, and 224J respectively. The output terminals OUT1, OUT2, and OUT3 of the matrix circuit 224A are connected to the input terminals of the latches 224B, 224C, and 224D, respectively.

As shown in FIG. 19, the switch 227 includes first and second sub switches 227A and 227B. The output terminal of the latch 224B is connected to a control terminal of the sub switch 227B. The output terminal of the latch 224C is connected to the enabling terminal of the latch 225. The output terminal of the latch 224D is connected to the input terminal IN3 of the matrix circuit 224A and a control terminal of the sub switch 227A. The latch 224D has an enabling terminal connected to the output terminal OUT1 of the matrix circuit 224A. The output terminal of the latch 224E is connected to the input terminal IN2 of the matrix circuit 224A. The latch 224E has an enabling terminal connected to the output terminal OUT2 of the matrix circuit 224A.

The signal generator 224F outputs a signal to the input terminal IN4 of the matrix circuit 224A which represents a predetermined positive threshold value (a positive reference value) +TH. The signal generator 224G outputs a signal to the input terminal IN5 of the matrix circuit 224A which represents a predetermined negative threshold value (a negative reference value) −TH. The signal generator 224H outputs a signal to the input terminal IN6 of the matrix circuit 224A which represents the upper limit of a prescribed signal level range M containing the "0" level or centered at the "0" level (see FIG. 16). The signal generator 224J outputs a signal to the input terminal IN7 of the matrix circuit 224A which represents the lower limit of the prescribed signal level range M.

Now, the character "in1" denotes the value represented by the signal applied to the input terminal IN1 of the matrix circuit 224A, that is, the output signal of the delay element 221. The character "in2" denotes the value represented by the signal applied to the input terminal IN2 of the matrix circuit 224A, that is, the output signal of the latch 224E. The character "in3" denotes the logic state of the signal applied to the input terminal IN3 of the matrix circuit 224A, that is, the output signal of the latch 224D. The character "out1" denotes the logic state of a signal which appears at the output terminal OUT1 of the matrix circuit 224A. The character "out2" denotes the logic state of a signal which appears at the output terminal OUT2 of the matrix circuit 224A. The character "out3" denotes the logic state of a signal which appears at the output terminal OUT3 of the matrix circuit 224A.

The matrix circuit 224A is designed to provide the following relation among signals inputted thereto and signals outputted therefrom. In the case where "in3" is "1" and "in1"<"in2", "out1" is "0" and "out2" is "1" while "out3" is "Qn−1" indicating a logic state equal to that available in the immediately-preceding sample interval. In the case where "in3" is "1" and "in1">"in2"+TH and "in1" is outside the prescribed range M, "out1" is "1" and "out2" is "1" while "out3" is "0". In the case where "in3" is "1" and "in1">"in2"+TH and "in1" is in the prescribed range M, "out1" is "0" and "out2" is "0" while "out3" is "Qn−1". In the case where "in3" is "1" and "in2"≦"in1"≦"in2"+TH, "out1" is "0" and "out2" is "0", and "out3" is "Qn−1". In the case where "in3" is "0" and "in1">"in2", "out1" is "0" and "out2" is "1" while "out3" is "Qn−1". In the case where "in3" is "0" and "in1"<"in2"−TH and "in1" is outside the prescribed range M, "out1" is "1" and "out2" is "1" while "out3" is "1". In the case where "in3" is "0" and "in1"<"in2"−TH and "in1" is in the prescribed range M, "out1" is "0" and "out2" is "0" while "out3" is "Qn−1". In the case where "in3" is "0" and "in2"≧"in1"≧"in2"−TH, "out1" is "0" and "out2" is "0" while "out3" is "Qn−1".

The latch 224B receives the signal from the output terminal OUT1 of the matrix circuit 224A, and periodically samples and holds the received signal in response to the bit clock signal. The latch 224B serves as a 1-sample delay circuit. The output signal from the latch 224B is applied to the control terminal of the sub switch 227B.

The latch 224C receives the signal from the output terminal OUT2 of the matrix circuit 224A, and periodically samples and holds the received signal in response to the bit clock signal. The latch 224C serves as a 1-sample delay circuit. The output signal from the latch 224C is applied to the enabling terminal of the latch 225.

The latch 224D receives the signal from the output terminal OUT3 of the matrix circuit 224A, and periodically samples and holds the received signal in response to the bit block signal. The latch 224D receives the signal from the output terminal OUT1 of the matrix circuit 224A as an enabling signal. The latch 224D is selectively enabled and disabled in response to the enabling signal. In general, the latch 224D is enabled when the enabling signal is "1". The latch 224D is disabled when the enabling signal is "0". The latch 224D serves as a 1-sample delay circuit when being enabled. When the latch 224D is disabled, the signal held by the latch 224D is inhibited from being updated. The output signal of the latch 224D is applied to the control terminal of the sub switch 227A and also the input terminal IN3 of the matrix circuit 224A.

The latch 224E receives the output signal of the delay element 221, and periodically samples and holds the received signal in response to the bit clock signal. The latch 224E receives the signal from the output terminal OUT2 of the matrix circuit 224A as an enabling signal. The latch 224E is selectively enabled and disabled in response to the enabling signal. In general, the latch 224E is enabled when the enabling signal is "1". The latch 224E is disabled when the enabling signal is "0". The latch 224E serves as a 1-sample delay circuit when being enabled. When the latch 224E is disabled, the signal held by the latch 224E is inhibited from being updated. The output signal of the latch 224E is applied to the input terminal IN2 of the matrix circuit 224A.

Input sides of the sub switch 227A are connected to the output terminals of the inverter 226 and the latch 225, respectively. The output side of the sub switch 227A is connected to an input side of the sub switch 227B. Another input side of the sub switch 227B is connected to the output terminal of the signal generator 229. The sub switch 227A selects either the output signal of the inverter 226 or the output signal of the latch 225 in response to the output signal of the latch 224D. Specifically, the sub switch 227A selects the output signal of the inverter 226 when the output signal of the latch 224D is "1". The sub switch 227A selects the output signal of the latch 225 when the output signal of the latch 224D is "0". The sub switch 227A transmits the selected signal to the sub switch 227B. The sub switch 227B selects either the output signal of the sub switch 227A or the output signal of the signal generator 229 in response to the output signal of the latch 224B. Specifically, the sub switch 227B selects the output signal of the sub switch 227A when the output signal of the latch 224B is "1". The sub switch 227B selects the output signal of the signal generator 229 when the output signal of the latch 224B is "0". The sub switch 227B transmits the selected signal to the latch 228.

The re-sampling DPLL section 15 in FIGS. 9 and 10 dispenses with an analog VCO which occupies a great space. Accordingly, the information reproducing apparatus in FIG. 9 can be small in size.

Second Embodiment

Figure 20:
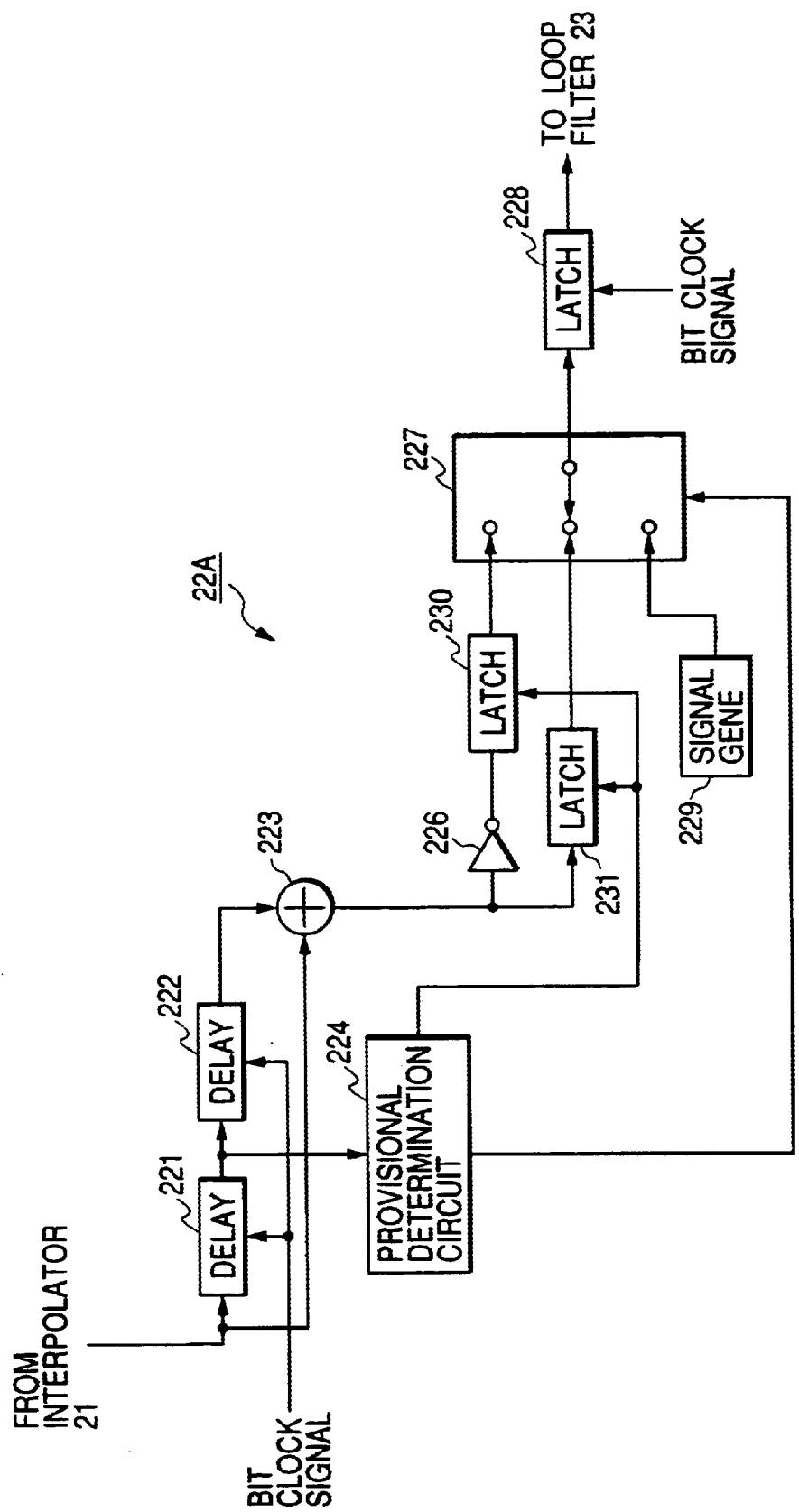
FIG. 20 is a block diagram of a phase detector in an information reproducing apparatus according to a second embodiment of this invention.

A second embodiment of this invention is similar to the first embodiment thereof except that a phase detector 22A replaces the phase detector 22 (see FIGS. 10 and 11). FIG. 20 shows the phase detector 22A in the second embodiment of this invention. The phase detector 22A is modified from the phase detector 22 so that latches 230 and 231 are additionally provided while the latch 225 (see FIG. 11) is removed.

In the phase detector 22A of FIG. 20, the output terminal of the calculator 223 is connected to the input terminals of the inverter 226 and the latch 231. The input terminal of the latch 230 is connected to the output terminal of the inverter 226. The output terminal of the latch 230 is connected to the first fixed contact of the switch 227. The output terminal of the latch 231 is connected to the second fixed contact of the switch 227. The latches 230 and 231 have enabling terminals connected to the first output terminal of the provisional determination circuit 224.

The latch 230 periodically samples and holds the output signal of the inverter 226 in response to the bit clock signal. The latch 230 is selectively enabled and disabled in response to the first control signal fed from the provisional determination circuit 224. The latch 231 periodically samples and holds the output signal of the calculator 223 in response to the bit clock signal. The latch 231 is selectively enabled and disabled in response to the first control signal fed from the provisional determination circuit 224. Thus, the latches 230 and 231 are controlled by the provisional determination circuit 224. The control of the latches 230 and 231 by the provisional determination circuit 224 is designed to implement the following process. Until the provisional determination circuit 224 decides a likeliest peak signal sample or detects a likely peak signal sample, the amplitude error (the level difference) between signal samples immediately preceding and immediately following the peak signal sample and the inversion of the amplitude error continue to be held by the latches 230 and 231. The switch 227 selects one among the output signal of the latch 230, the output signal of the latch 231, and the output signal of the signal generator 229 in response to the switch control signal fed from the provisional determination circuit 224. The switch 227 transmits the selected signal to the latch 228. The device 228 periodically latches the signal from the switch 227 in response to the bit clock signal. The latch 228 outputs the resultant signal to the loop filter 23 as the phase error signal.

Third Embodiment

A third embodiment of this invention is similar to the first embodiment thereof except for design changes mentioned hereafter. The third embodiment of this invention features that the threshold value (the reference level) used in the provisional determination circuit 224 (see FIGS. 11 and 19) is adaptively varied in response to the amplitude represented by the signal inputted thereinto.

In the third embodiment of this invention, the provisional determination circuit 224 includes an amplitude detector or a peak hold circuit for detecting the amplitude represented by the signal inputted thereinto. The provisional determination circuit 224 also includes a section for increasing and decreasing the threshold value (the reference level) as the detected amplitude increases and decreases respectively.

The adaptive variation of the threshold value (the reference level) provides reliable detection of every true peak-corresponding signal sample regardless of the amplitude represented by the signal inputted into the provisional determination circuit 224.

Fourth Embodiment

A fourth embodiment of this invention is similar to the first embodiment thereof except for design changes mentioned hereafter. The fourth embodiment of this invention features that the threshold value (the reference level) used in the provisional determination circuit 224 (see FIGS. 11 and 19) is adaptively varied in response to the frequency spectrum represented by the signal inputted thereinto.

In the fourth embodiment of this invention, the provisional determination circuit 224 includes a frequency spectrum detector for sensing the frequency spectrum represented by the signal inputted thereinto. Specifically, the frequency spectrum detector senses the amplitude of high-frequency components of the signal inputted into the provisional determination circuit 224 relative to the amplitude of low-frequency components thereof. The provisional determination circuit 224 also includes a section for increasing and decreasing the threshold value (the reference level) as the sensed relative amplitude of high-frequency signal components increases and decreases respectively.

The adaptive variation of the threshold value (the reference level) provides reliable detection of every true peak-corresponding signal sample regardless of the frequency spectrum represented by the signal inputted into the provisional determination circuit 224.

A first example of the frequency spectrum detector includes a high-frequency signal detector and a low-frequency signal detector operating on the signal inputted into the provisional determination circuit 224, a subtracter for calculating a difference between the amplitudes detected by the high-frequency signal detector and the low-frequency signal detector, and a comparator for comparing the calculated difference with a preset criterion.

A second example of the frequency spectrum detector includes a high pass filter and a low pass filter operating on the signal inputted into the provisional determination circuit 224, amplitude detectors for sensing the amplitudes represented by the output signals of the high pass filter and the low pass filter, a subtracter for calculating a difference between the sensed amplitudes, and a comparator for comparing the calculated difference with a preset criterion.

Fifth Embodiment

Figure 21:
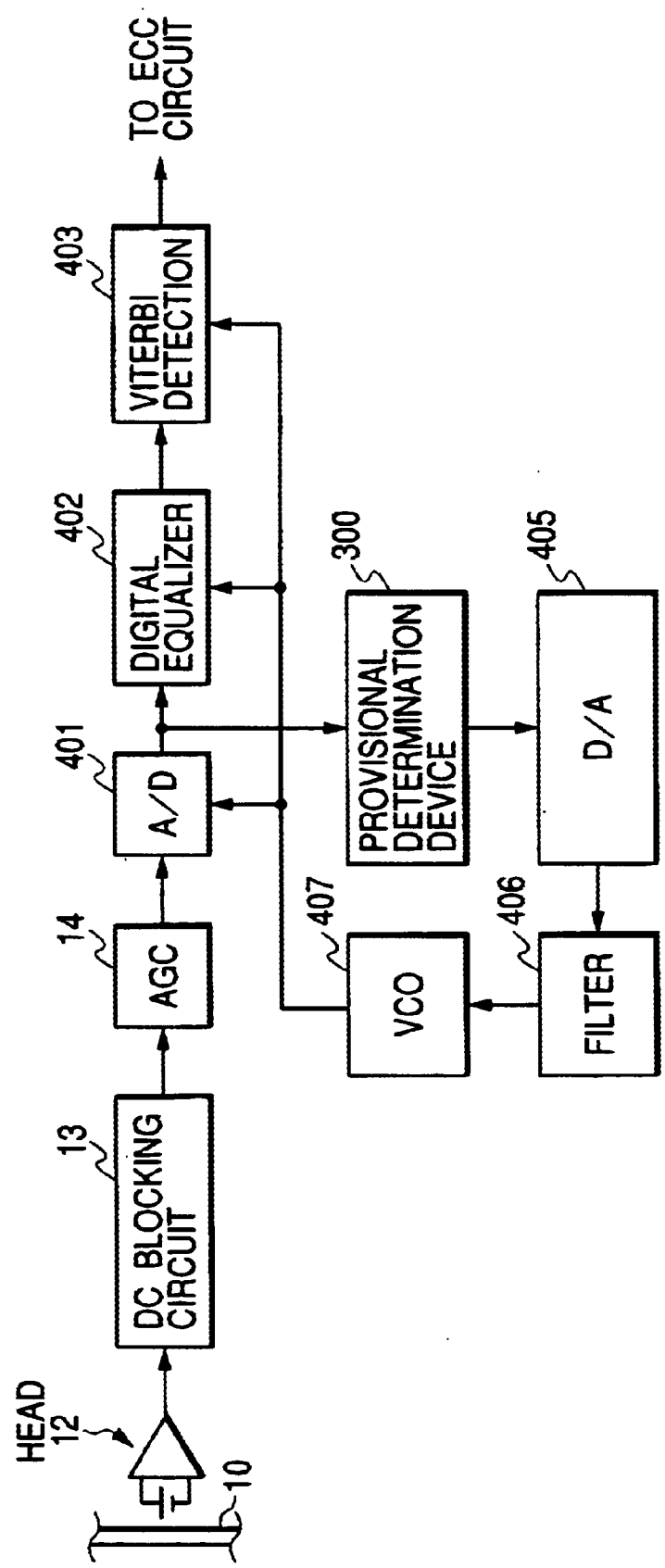
FIG. 21 is a block diagram of an information reproducing apparatus according to a fifth embodiment of this invention.

FIG. 21 shows an information reproducing apparatus according to a fifth embodiment of this invention. With reference to FIG. 21, an optical disc 10 stores a signal of a run-length-limited code at a predetermined high recording density. An optical head 12 reads out the signal of the run-length-limited code from the optical disc 10 in a suitable method such as a tangential push-pull method. The read-out signal has a waveform of a differential type. The optical head 12 outputs the read-out signal to a direct-current blocking circuit (a DC blocking circuit) 13. The optical head 12 includes a photodetector, and an amplifier following the photodetector.

The circuit 13 blocks a direct-current component (a DC component) of the read-out signal, and passes only alternating-current components (AC components) thereof. The output signal of the DC blocking circuit 13 is applied to an AGC (automatic gain control) circuit 14. The AGC circuit 14 subjects the output signal of the DC blocking circuit 13 to automatic gain control for providing a constant signal amplitude. The AGC circuit 14 outputs the resultant signal to an A/D (analog-to-digital) converter 401. The A/D converter 401 changes the output signal of the AGC circuit 14 into a corresponding digital signal. Specifically, the A/D converter 401 periodically samples the output signal of the AGC circuit 14 in response to a system clock signal, and converts every resultant sample into a digital sample. The A/D converter 401 outputs the digital signal (that is, a sequence of the resultant digital samples) to a digital equalizer 402 and a provisional determination device 300.

The digital equalizer 402 subjects the output signal of the A/D converter 401 to processing in response to the system clock signal. The processing by the digital equalizer 402 corresponds to waveform equalization. The digital equalizer 402 outputs the processing-resultant signal to a viterbi detection circuit 403. The viterbi detection circuit 403 periodically determines a value of the output signal of the digital equalizer 402 in response to the system clock signal, and recovers a two-value information signal on the basis of the value determination result. The viterbi detection circuit 403 outputs the recovered two-value information signal to an ECC circuit, that is, an error checking and correcting circuit (not shown).

The provisional determination device 300 provisionally determines a value of the output signal of the A/D converter 401, and generates an error signal on the basis of the provisional determination result. The provisional determination device 300 outputs the error signal to a D/A (digital-to-analog) converter 405. The D/A converter 405 changes the error signal into a corresponding analog signal. The D/A converter 405 outputs the analog signal to a filter (a loop filter) 406. The filter 406 is of a low pass type. The filter 406 integrates the output signal of the D/A converter 405 into a control voltage. The filter 406 outputs the control voltage to an analog VCO (voltage-controlled oscillator) 407. The analog VCO 407 oscillates at a frequency responsive to the control voltage, and hence generates the system clock signal having a frequency equal to the frequency of the oscillation. The analog VCO 407 outputs the system clock signal to the A/D converter 401, the digital equalizer 402, and the viterbi detection circuit 403.

Preferably, a DC removing circuit (not shown) is provided between the A/D converter 401 and the digital equalizer 402. The DC removing circuit sets a DC level, that is, a direct-current level of the output signal of the A/D converter 401. The digital equalizer 402 processes the output signal of the DC removing circuit.

Figure 22:
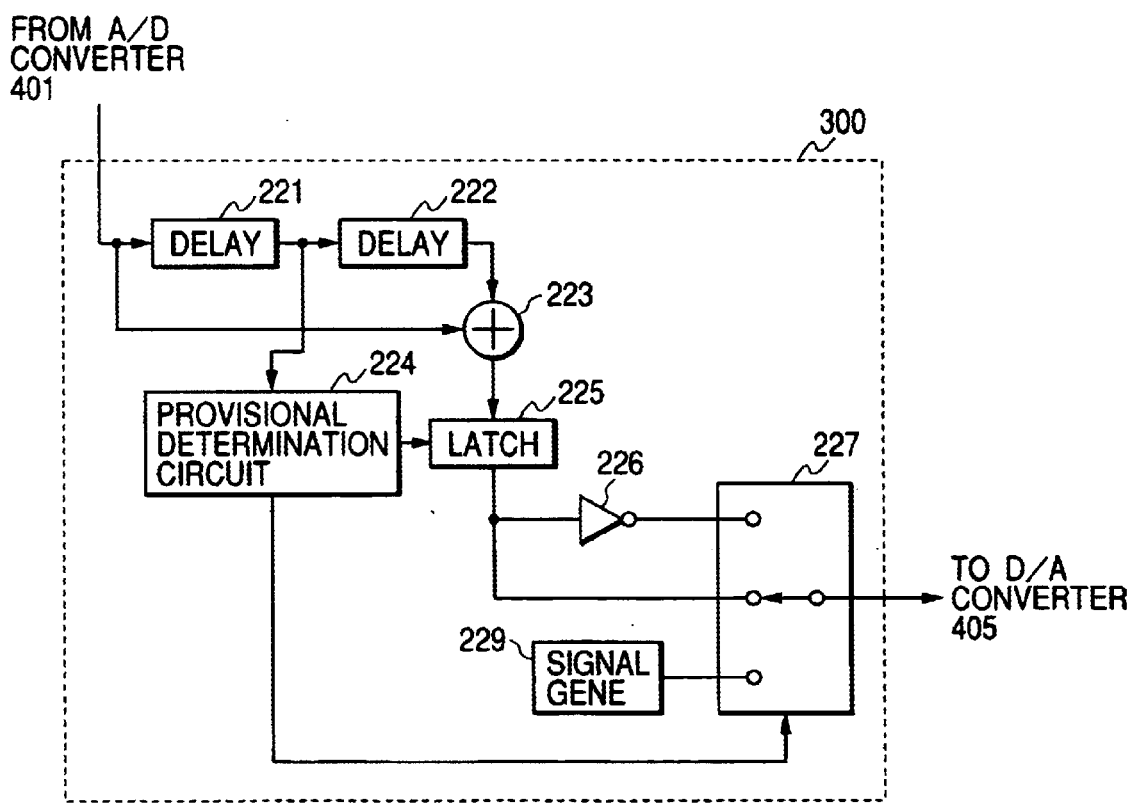
FIG. 22 is a block diagram of a provisional determination device in FIG. 21.

FIG. 22 shows an example of the provisional determination device 300. The provisional determination device 300 of FIG. 22 is similar to the phase detector 22 in FIG. 11 except for design changes mentioned hereafter. The delay element 221 and the calculator 223 in the provisional determination device 300 receive the output signal of the A/D converter 401. The delay elements 221 and 222 in the provisional determination device 300 respond to the system clock signal generated by the analog VCO 407. The signal selected by the switch 227 in the provisional determination device 300 is directly fed to the D/A converter 405.

The provisional determination circuit 224 in the provisional determination device 300 invalidates each detected peak signal sample whose level is in the prescribed range M. In other words, the provisional determination circuit 224 judges that each detected peak signal sample whose level is in the prescribed range M is false. On the other hand, the provisional determination circuit 224 judges that each detected peak signal sample whose level is outside the prescribed range M is true. The provisional determination circuit 224 excludes false peak signal samples from the generation of the error signal outputted from the provisional determination device 300. Thus, only true peak signal samples are used in the generation of the error signal.

Sixth Embodiment

A sixth embodiment of this invention is similar to one of the first to fifth embodiments thereof except that the provisional determination circuit 224 detects a likely peak-corresponding signal sample or an actual peak-corresponding signal sample according to a maximum-likelihood detection algorithm based on the viterbi decoding theory.

Seventh Embodiment

A seventh embodiment of this invention is similar to one of the first to sixth embodiments thereof except for design changed mentioned hereafter. The seventh embodiment of this invention includes a phase lock control apparatus designed as follows.

The phase lock control apparatus detects every peak-corresponding signal sample by referring to the relation between the levels represented by successive signal samples. The phase lock control apparatus calculates the level difference between signal samples immediately preceding and immediately following the detected peak-corresponding signal sample. The phase lock control apparatus generates a phase error signal on the basis of the calculated level difference. The phase lock control apparatus operates to implement phase lock in response to the phase error signal on a feedback control basis designed so as to decrease or nullify the calculated level difference.

The phase lock control apparatus determines whether or not the level represented by every detected peak-corresponding signal sample is in a prescribed range M containing the "0" level or centered at the "0" level. The phase lock control apparatus judges that detected peak-corresponding signal samples whose levels are in the prescribed range M are false. The phase lock control apparatus judges that detected peak-corresponding signal samples whose levels are outside the prescribed range M are true. The phase lock control apparatus uses only true peak-corresponding signal samples in generating the phase error signal.

Eighth Embodiment

An eighth embodiment of this invention is similar to one of the first to seventh embodiments thereof except for design changes mentioned hereafter. The eighth embodiment of this invention is applied to a signal transmitting and receiving apparatus including a ghost canceler, a signal transmitting and receiving apparatus including a communication modem, or a recording and reproducing apparatus of a digital VTR type.

Ninth Embodiment

A ninth embodiment of this invention is similar to one of the first to eighth embodiments thereof except that the provisional determination circuit 224 is used also as a viterbi decoding circuit for deriving a likeliest reproduced digital information signal.

What is claimed is:

1. An information reproducing apparatus comprising:
   first means for periodically generating a sample of an information signal in response to a sampling clock signal;
   second means for detecting a level relation between successive ones of the information-signal samples generated by the first means;
   third means for detecting a peak-corresponding sample among the information-signal samples in response to the level relation detected by the second means and in response to a prescribed level range containing a "0" level, wherein a level represented by the peak-corresponding sample detected by the third means is outside the prescribed level range;
   fourth means for calculating a level difference between information-signal samples immediately preceding and immediately following the peak-corresponding sample detected by the third means;
   fifth means for generating a phase error signal in response to the level difference calculated by the fourth means; and
   sixth means for controlling the sampling clock signal in response to the phase error signal to lock the sampling clock signal in phase with the information signal.

2. An information reproducing apparatus as recited in claim 1, further comprising a waveform equalizer for subjecting the information signal to PR (a, b, −b, −a) waveform equalization to generate an equalization-result signal, and a decoder for decoding the equalization-result signal into original information.

3. A reproducing apparatus as recited in claim 1, wherein the analog signal representative of the digital information comprises a signal reproduced from an optical-disc recording medium in a tangential push-pull method.

4. An information reproducing apparatus comprising:
   an analog-to-digital converter for converting an analog signal representative of digital information into a first digital information signal; and
   a re-sampling DPLL section for periodically re-sampling the first digital information signal in response to a bit clock signal to convert the first digital information signal into a second digital information signal;
   wherein the re-sampling DPLL section comprises:
   (1) an interpolator for generating samples of the second digital information signal from samples of the first digital information signal through interpolation responsive to the bit clock signal;
   (2) a provisional determination device for detecting a peak-corresponding sample among the samples of the second digital information signal in response to a prescribed level range containing a "0" level, wherein a level represented by the detected peak-corresponding sample is outside the prescribed level range;

(3) a calculator for calculating a level difference between samples immediately preceding and immediately following the detected peak-corresponding sample;

(4) means for generating a phase error signal in response to the calculated level difference; and (5) means for controlling the bit clock signal in response to the generated phase error signal to lock the bit clock signal in phase with the first digital information signal.

5. An information reproducing apparatus as recited in claim 4, wherein the provisional determination device comprises a provisional determination circuit for detecting a likeliest peak-corresponding sample among the samples of the second digital information signal on a maximum-likelihood detection basis.

6. An information reproducing apparatus as recited in claim 5, wherein the provisional determination circuit comprises means for detecting the likeliest peak-corresponding sample in response to a threshold value, and means for varying the threshold value.

7. An information reproducing apparatus as recited in claim 2, wherein the calculator comprises means for calculating a level difference between samples immediately preceding and immediately following a sample of interest, and means for holding the calculated level difference until the provisional determination circuit judges the sample of interest to be the likeliest peak-corresponding sample.

8. An information reproducing apparatus as recited in claim 6, wherein the calculator comprises means for calculating a level difference between samples immediately preceding and immediately following a sample of interest, and means for holding the calculated level difference until the provisional determination circuit judges the sample of interest to be the likeliest peak-corresponding sample.

9. An information reproducing apparatus as recited in claim 2, wherein the provisional determination circuit comprises means for detecting the likeliest peak-corresponding sample in response to a threshold value, means for detecting at least one of (1) a frequency condition and (2) an amplitude condition represented by the samples of the second digital information signal, and means for varying the threshold value in response to the detected at least one of the frequency condition and the amplitude condition.

10. An information reproducing apparatus as recited in claim 2, wherein the analog signal representative of the digital information comprises a signal transmitted by a partial-response system using an inter-symbol interference.

11. A phase lock control apparatus apparatus comprising:

an analog-to-digital converter for converting an analog signal representative of digital information into a sequence of samples of a digital information signal in response to a sampling clock signal;

a provisional determination device for detecting a peak-corresponding sample among the samples of the digital information signal in response to a prescribed level range containing a "0" level, wherein a level represented by the detected peak-corresponding sample is outside the prescribed level range;

a calculator for calculating a level difference between samples immediately preceding and immediately following the peak-corresponding sample detected by the provisional determination device;

first means for generating a phase error signal in response to the level difference calculated by the calculator; and second means for controlling the sampling clock signal in response to the phase error signal generated by the first means to lock the sampling clock signal in phase with the analog signal.

* * * * *